United States Patent [19]

Baum et al.

[11] Patent Number: 5,220,669
[45] Date of Patent: Jun. 15, 1993

[54] LINKAGE MECHANISM FOR PROGRAM ISOLATION

[75] Inventors: Richard I. Baum; Terry L. Borden; Carol E. Clark, all of Poughkeepsie; Alan G. Ganek, Chappaqua, all of N.Y.; James Lum, Redwood City, Calif.; Michael G. Mall, Lagrangeville, N.Y.; Casper A. Scalzi, Poughkeepsie, N.Y.; Richard J. Schmalz, Wappingers Falls, N.Y.

[73] Assignee: International Business Machines Corporation, Armonk, N.Y.

[21] Appl. No.: 732,936

[22] Filed: Jul. 19, 1991

Related U.S. Application Data

[63] Continuation of Ser. No. 154,733, Feb. 10, 1988, abandoned.

[51] Int. Cl.⁵ ............................................. G06F 9/42
[52] U.S. Cl. ................................ 395/775; 364/DIG. 2; 364/938.0; 364/946.3; 364/946.2; 364/964.6; 364/964.0; 364/971.0
[58] Field of Search ................... 364/DIG. 1, DIG. 2; 395/775, 800

[56] References Cited

U.S. PATENT DOCUMENTS

| | | | |
|---|---|---|---|
| 3,787,813 | 1/1974 | Cole et al. | 364/200 |
| 4,037,214 | 7/1977 | Birney et al. | 364/200 |
| 4,041,462 | 8/1977 | Davis et al. | 364/200 |
| 4,044,334 | 7/1977 | Bachman et al. | 364/200 |
| 4,096,573 | 7/1978 | Heller et al. | 364/200 |
| 4,104,721 | 8/1978 | Markstein et al. | 364/200 |
| 4,136,385 | 1/1979 | Gannon et al. | 364/200 |
| 4,268,903 | 5/1981 | Miki et al. | 364/200 |
| 4,297,743 | 10/1981 | Appell et al. | 364/200 |
| 4,355,355 | 10/1982 | Butwell et al. | 364/200 |
| 4,366,536 | 12/1982 | Kohn | 364/200 |
| 4,366,537 | 12/1982 | Heller et al. | 364/200 |
| 4,407,016 | 9/1983 | Bayliss et al. | 364/200 |
| 4,420,807 | 12/1983 | Nolta et al. | 364/200 |
| 4,430,705 | 2/1984 | Cannavino et al. | 364/200 |
| 4,454,580 | 6/1984 | Page et al. | 364/200 |
| 4,455,602 | 6/1984 | Baxter, III et al. | 364/200 |
| 4,500,952 | 2/1985 | Heller et al. | 364/200 |
| 4,521,846 | 6/1985 | Scalzi et al. | 364/200 |
| 4,530,049 | 7/1985 | Zee | 364/200 |
| 4,546,430 | 10/1985 | Moore et al. | 364/200 |
| 4,594,659 | 6/1986 | Guenthner et al. | 364/200 |
| 4,630,234 | 12/1986 | Holly | 364/900 |
| 4,731,734 | 3/1988 | Gruner et al. | 364/200 |
| 4,766,537 | 8/1988 | Zolinowsky | 364/200 |
| 4,811,208 | 3/1989 | Myers et al. | 395/800 |

OTHER PUBLICATIONS

IBM Technical Disclosure Bulletin—vol. 24, No. 8, Jan. 1982 pp. 4401–4403 entitled "Method of revoking A Capability Containing A Pointer-Type Identifier Without Accessing the Capability" by K. E. Plambeck. "IBM System/370 Extended Architecture—Principles of Operation" manual—Publication No. SA22-7085-1.

Primary Examiner—David L. Clark
Assistant Examiner—Maria N. Von Buhr
Attorney, Agent, or Firm—Bernard M. Goldman; Richard M. Ludwin

[57] ABSTRACT

A computer system has general purpose registers, control registers and access registers for containing information to allow address space capability. A linkage stack uses protected address space to store state information during program call and program return operations. The linkage stack contains information relating to state entries for the saved information and header and trailer entries to point to other linkage stack sections. A control register contains the pointer to the current linkage stack entry and is changed as the program call or return moves through the stack.

4 Claims, 16 Drawing Sheets

FIG. 1
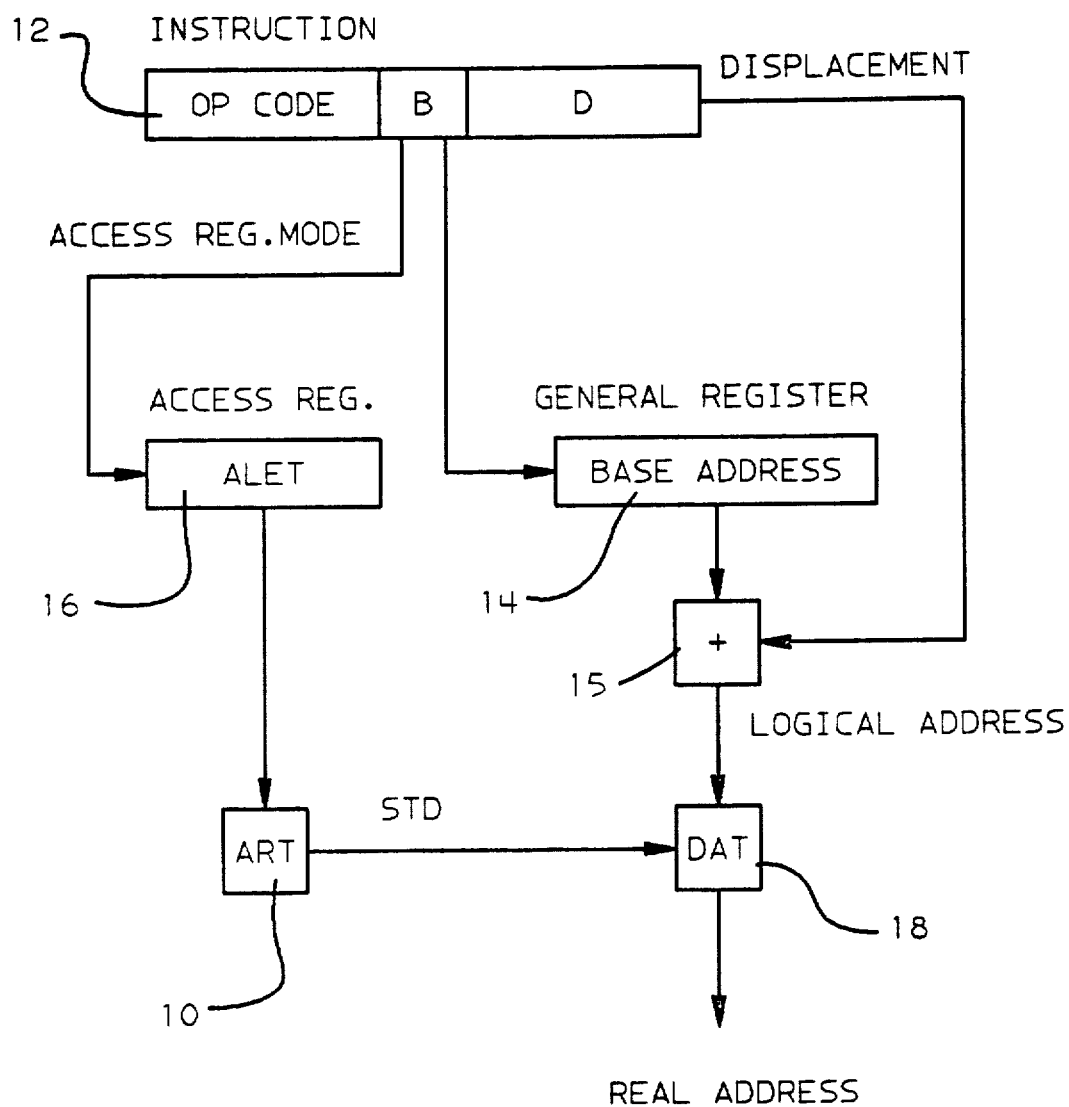
FIG. 4
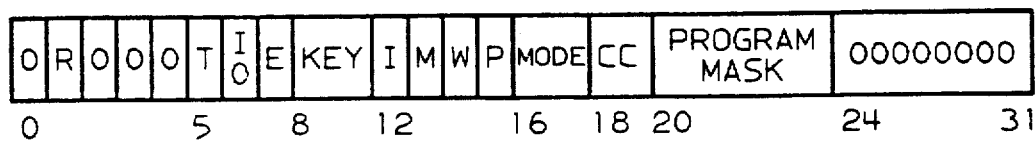
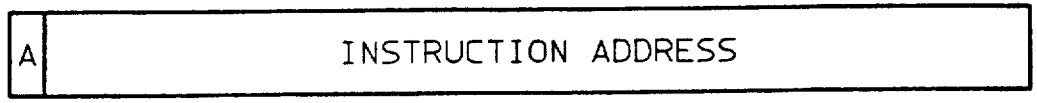

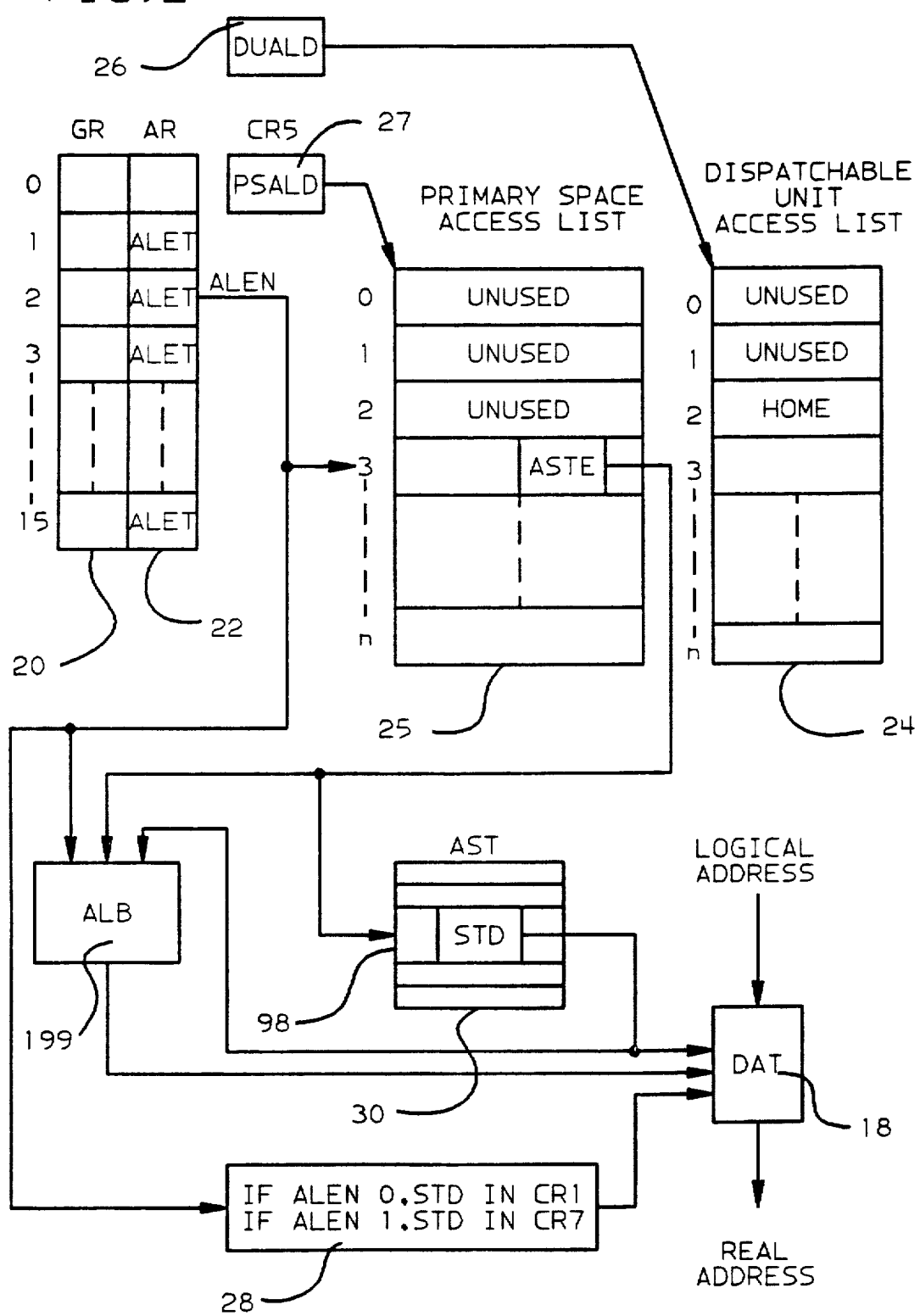

FIG. 3

REG. NO. — CONTROL REGISTERS

| Reg | Contents |
|---|---|
| 0 | M (15) |
| 1 | PRIMARY SEGMENT-TABLE DESIGNATION (PSTD): X (0) \| PSTO (1–19) \| (20) \| PSTL (25) |
| 2 | DISPATCHABLE-UNIT-CONTROL-TABLE ORIGIN (DUCTO) (0–25) (26) |
| 3 | PSW KEY MASK (PKM) (0–15) \| SECONDARY-ADDRESS-SPACE NUMBER (SASN) (16–31) |
| 4 | AUTHORIZATION INDEX (AX) (0–15) \| PRIMARY-ADDRESS-SPACE NUMBER (PASN) (16–31) |
| 5 | 0 \| PRIMARY-ASTE ORIGIN (PASTEO) (1–25) (26) |
| 6 | |
| 7 | SECONDARY SEGMENT-TABLE DESIGNATION (SSTD): 0 \| SSTO (1–19) \| (20) \| SSTL (25) |
| 8 | EXTENDED AUTHORIZATION INDEX (EAX) (0–15) |
| 9 | |
| 10 | |
| 11 | |
| 12 | |
| 13 | HOME SEGMENT-TABLE DESIGNATION (HSTD): X (0) \| HSTO (1–19) \| (20) \| HSTL (25) |
| 14 | T (12) \| ASN-FIRST-TABLE ORIGIN (AFTO) (20–31) |
| 15 | 0 \| LINKAGE-STACK-ENTRY ADDRESS (28) |

FIG. 5

ACCESS-LIST-ENTRY TOKEN (ALET)

| 0000000 | P | ALESN | ALEN |
|---|---|---|---|
| 0 | 7 8 | 16 | 31 |

FIG. 6  ACCESS-LIST ENTRY (ALE)

| I | | P | ALESN | ACCESS LIST EXTENDED AUTHORIZATION INDEX (ALEAX) | |
|---|---|---|---|---|---|
| 1 | | 7 8 | 16 | 32 | 63 |

| | ASTE ADDRESS | | ASTE SEQ. NO. (ASTESN) |
|---|---|---|---|
| 65 | | 90 96 | 127 |

FIG. 7  LINKAGE-TABLE ENTRY (LTE)

| I | 0000000 | ETO | ETL |
|---|---|---|---|
| 1 | 8 | | 26  31 |

FIG. 8  ENTRY-TABLE ENTRY (ETE)

| AUTH KEY MASK (AKM) | EASN | A | INSTRUCTION ADDRESS (EIA) | P |
|---|---|---|---|---|
| 0 | 16 | 32 | | 63 |

| ENTRY PARAMETER | ENTRY KEY MASK (EKM) | |
|---|---|---|
| 64 | 96 | 112  127 |

| T | K | M | E | C | S | EK | ENTRY EAX | ASTE ADDRESS | |
|---|---|---|---|---|---|---|---|---|---|
| 128 | 131 | | | | 136 | 140 144 | 160 | | 186 |

AUTHORITY TABLE (AT)

| BYTE (DEC) | DISPATCHABLE-UNIT-CONTROL TABLE (DUCT) |
|---|---|
| 0 / 4 / 8 / 12 | |
| 16 | DUALD — 0 \| 1  ACCESS-LIST ORIGIN \| ALL  25  31 |
| 20 / 24 | |
| 28 | ///////////////////////// |
| 32 ... 60 | |

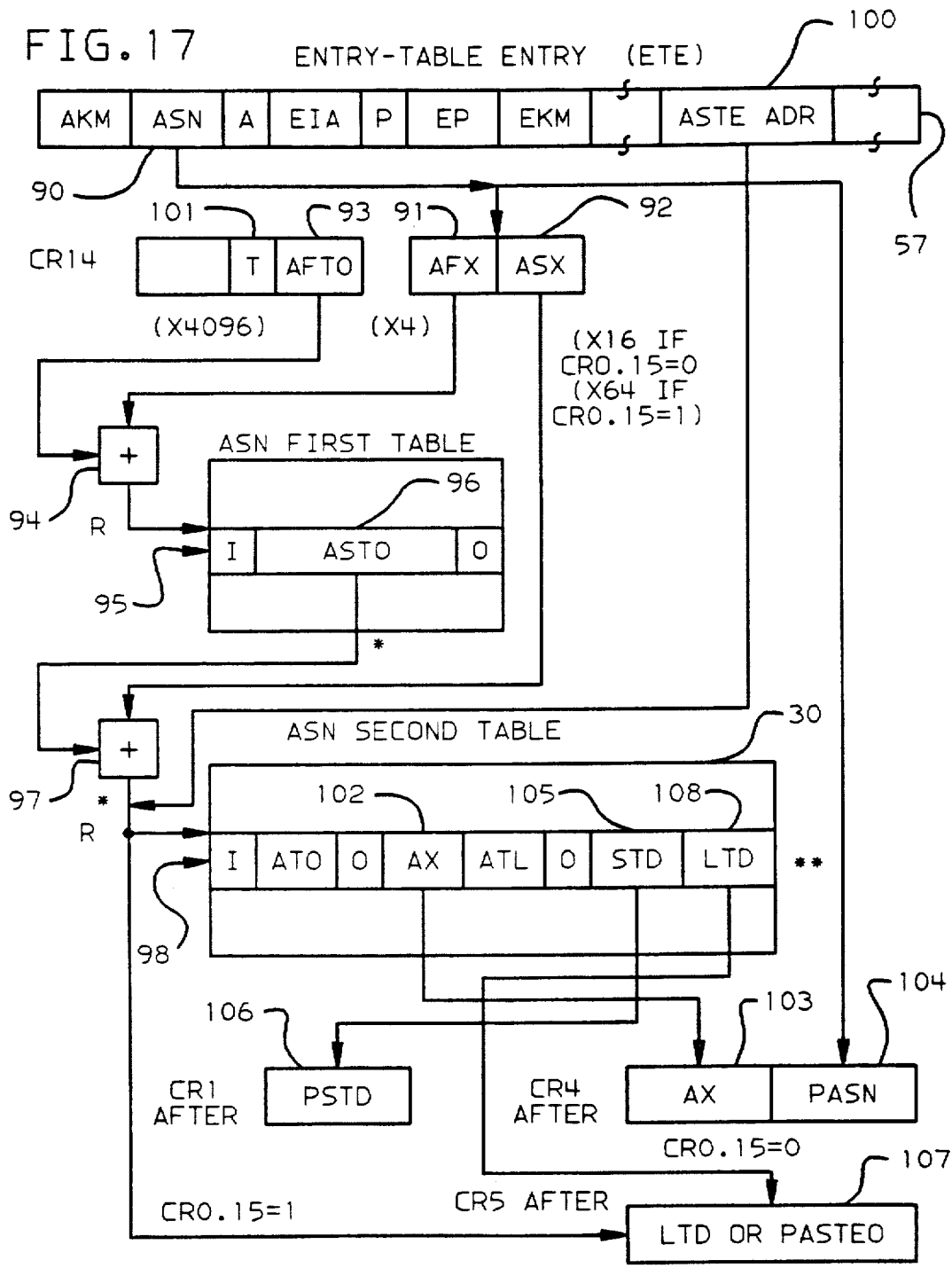

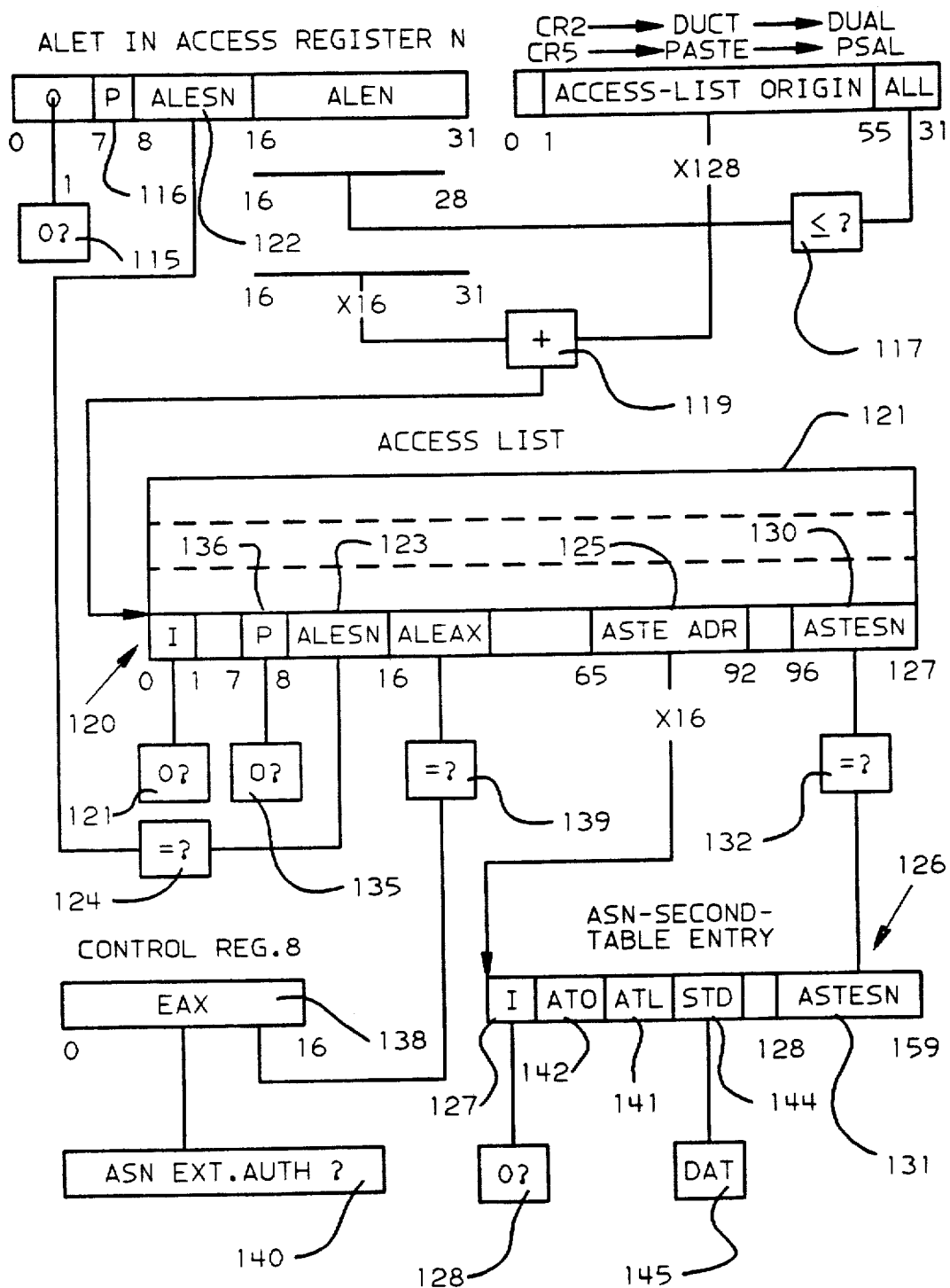
FIG. 18 ACCESS-REGISTER TRANSLATION (ART)

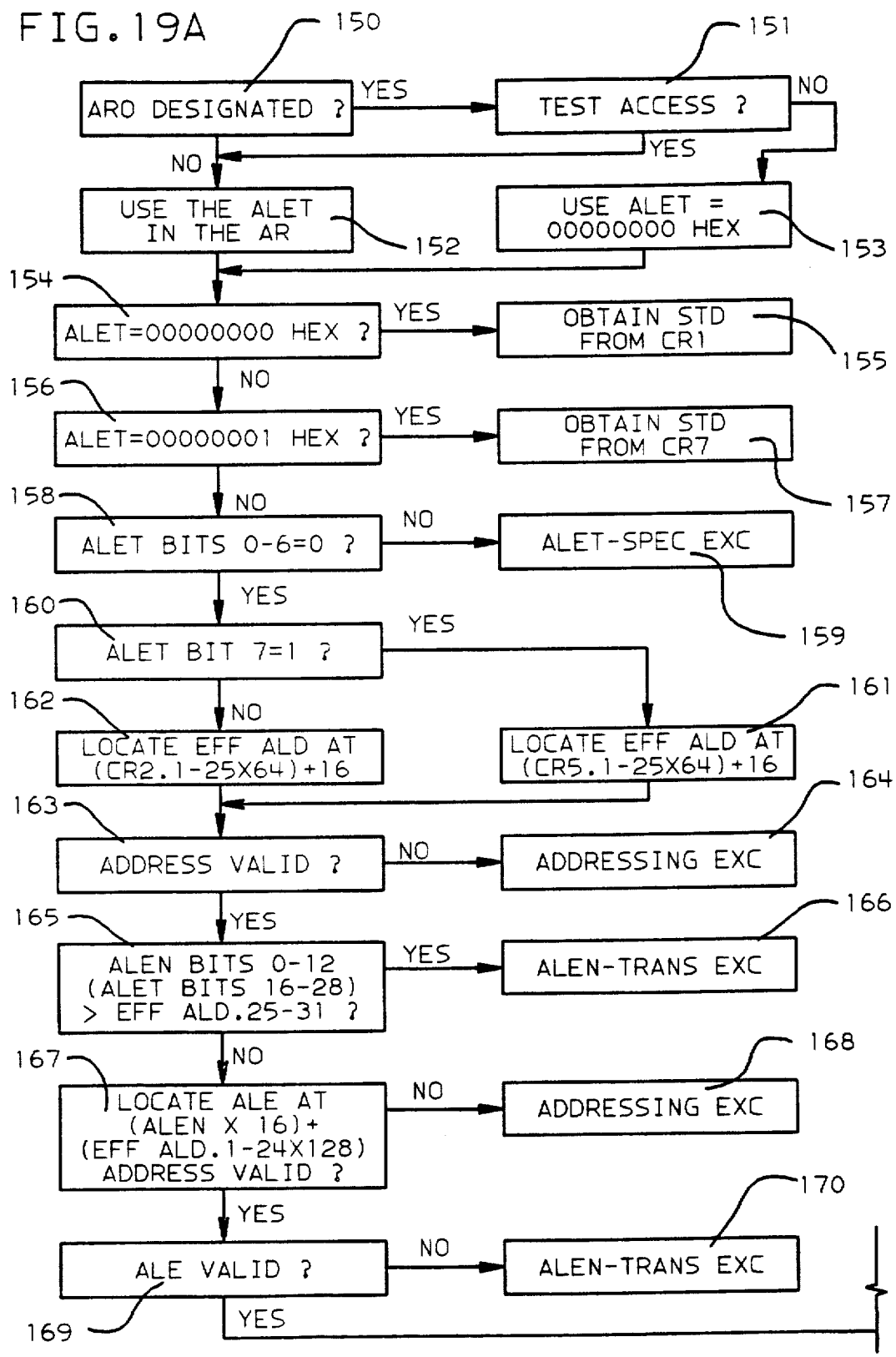

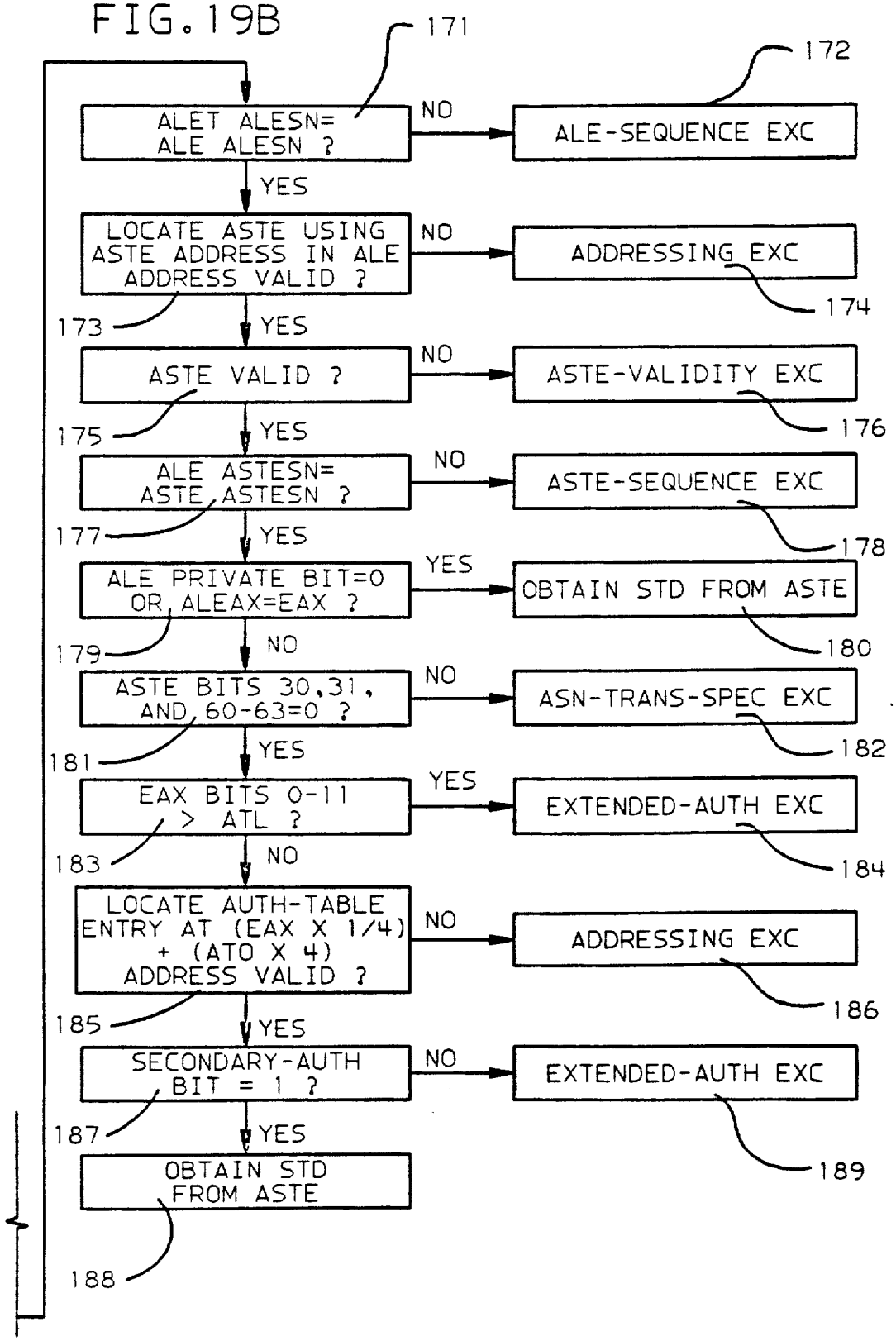

FIG.21

| ALDSO | ALET | P | ALEAX | ASTE ADR | ASTESN |

ALB COMBINED ALD ALE

FIG.22

| ALDSO | ALET | P | ALEAX | ATO | ATL | STD |

ALB COMBINED ALD ALE ASTE

FIG.23

| ALDSO | ALET | P | ALEAX | STD | EAX | S |

ALB COMBINED ALD ALE ASTE ATE

FIG.24

| ALET | STD |

ALB COMBINED ALE ASTE ATE
(ALB PURGE ON ALDSO OR EAX CHANGE
IN CR2 OR CR8)

LINKAGE MECHANISM FOR PROGRAM ISOLATION

This is a continuation of copending application Ser. No. 07/154,733, filed on Feb. 10, 1988, now abandoned.

CROSS REFERENCE TO RELATED APPLICATIONS

This application contains subject matter which is related to the subject matter of the following applications filed on even date herewith and assigned to the same assignee:

"Nonhierarchical Program Authorization Mechanism" by R. I. Baum et al, Ser. No. 154,740, which issued on Jun. 11, 1991 as U.S. Pat. No. 5,023,773; "Multiple Address Space Token Designation, Protection Controls, Designation Translation and Lookaside" by R. I. Baum, et al, Ser. No. 535,248, issued on Dec. 18, 1990 as U.S. Pat. No. 4,979,098 as a continuation of Ser. No. 154,689, Filed Feb. 10, 1988, Abandoned; "Control Mechanism For Zero-Origin Data Spaces" by C. A. Scalzi et al, Ser. No. 154,688, which issued on Apr. 16, 1991 as U.S. Pat. No. 5,088,811; "Data Domain Switching On Program Address Space Switching And Return" by C. E. Clark et al, Ser. No. 154,685, which issued on Jul. 31, 1990 as U.S. Pat. No. 4,945,480; and "Operating System Accessing Control Blocks By Using Home Address Space Segment Table To Control Instruction and Operand Fetch and Store Operations" by C. E. Clark, Ser. No. 154,780, which issued on Jul. 24, 1990 as U.S. Pat. No. 4,943,913.

FIELD OF THE INVENTION

The invention relates to a method and means for enabling a program or programs being executed in a data processing system to have concurrent access to multiple virtual address spaces. In this system, access registers corresponding to general purpose registers contain tokens to allow the system to identify address spaces. The tokens are used to specify an access list entry for obtaining a segment table designation in a translation process. The use of tokens allows system control of address spaces to be isolated from program control of access registers. This invention is an improvement over the access register system shown in U.S. Pat. No. 4,355,355.

DESCRIPTION OF THE PRIOR ART

Data processing systems using virtual addressing in multiple virtual address spaces, such as the IBM System/370 Systems using MVS controlled programming, are well known. The organization and hardware/architectural aspects of the IBM System/370 are described in the "IBM System/370-XA Principles of Operation", form number SA22-7085-1. The described MVS system includes a central processing unit (CPU) which contains the sequencing and processing facilities for instruction execution, interruption action, timing functions, initial program loading, and other machine related functions. Also included is a main storage, which is directly addressable and provides for high speed processing of data by the CPU. The main storage may be either physically integrated with the CPU, or constructed in stand alone units.

U.S. Pat. No. 4,096,573 to A. R. Heller et al for "DLAT Synonym Control Means for Common Portions of All Address Spaces" and U.S. Pat. No. 4,136,385 to P. M. Gannon et al for "Synonym Control Means for Multiple Virtual Storage Systems" both assigned to the same assignee of the present invention, disclose MVS systems in which the main storage may be allocated as address spaces for use by multiple users, each address space containing a portion defined as common among all of the users. The result is that a user may isolate programs or data from other users by placing them in a "private" portion of the user's assigned address space, or he may make them accessible to all other users by placing the programs or data in "common". In such a system, data may be moved between two address spaces by having a program in the first address space move the data from its private area into common and then signal a program in the other address space to operate on, or further move, the data. The use of common as a communication area between address spaces increases the size of the common area and thus reduces the size of the private area available to all users. Signalling from one program to another can only be done by subsystems or the control program. Data is protected by storage protect keys. However, there are only 16 such keys, which are not enough to guarantee that the information is protected from an inadvertent store by another subsystem or authorized program since the information is commonly addressable.

U.S. Pat. No. 4,355,355 assigned to the same assignee as the present application, shows access registers (AR's) associated with the general purpose registers (GPRs) in a data processor. The AR's are each loaded with a unique STD (segment table descriptor). The STD comprises a segment table address in main storage and a segment table length field. There are a predetermined number of AR's associated respectively with the GPR's in a processor to define a subset of up to the predetermined number of data address spaces up to a maximum of one address space for each GPR. The STD in an AR is selected for address translation when the associated GPR is selected as a storage operand base register, such as being the GPR selected by the B-field in an IBM System/370 instruction. Each AR may also specify that it does not use the STD in its associated AR to define its data address space, but instead uses the STD in the program address space AR. However, the STD content of an AR is not selected for an address translation if the associated GPR is selected for a purpose other than as a storage operand base register, such as if a GPR is selected as an index (X) register or as a data source or sink register (R) for an instruction. A sixteenth AR may be provided to define and control the executing program address space, which may also contain data.

U.S. Pat. Nos. 4,366,537, 4,430,705 and 4,500,952, assigned to the same assignee as the present application, all deal with the dual address space (DAS) concept for which the present access register multiple address space (MAS) concept is an improvement. These patents deal with systems in which one program in one address space is permitted to obtain access to data in another address space or to call a program in another address space without invoking a supervisor. Each of a plurality of address spaces assigned an Address Space Number (ASN) has an associated set of address translation tables. A second address space can be designated by a program, and when authorized, the program can cause transfer of data in main memory from one physical location to another associated with the different address space. A program changeable space selection control bit controls use of two different sets of address translation tables associated with two different address spaces. Without invoking a supervisor, a particular program in an assigned address space can call a program in another address space or obtain addressability to data in another address space having an associated set of address translation tables.

U.S. Pat. No. 4,037,214, assigned to the same assignee as the present application, shows a horizontal addressing system in which multiple access keys in an access key register (AKR) switch the address space of a storage access as a function of an instruction address, a sink operand address and a source operand address, respectively.

U.S. Pat. No. 4,521,846 issued to the same assignee as the present invention and entitled "Mechanism for Accessing Multiple Virtual Spaces" shows another mechanism for controlling access to plural virtual address spaces in a cross-memory implementation where data can be accessed in a non-privileged state.

U.S. Pat. No. 3,787,813 shows the concept of data processing devices using capability registers. The patent shows a data processing device with a central processing unit and a storage unit, the information in the storage unit being arranged in segments and the central processing unit having a plurality of capability registers each arranged to store descriptor information indicative of the base and limit addresses of an information segment. One of the capability registers is arranged to hold information defining the base and limit addresses of an information segment which contains a segment pointer table, particular to the program currently being executed by the central processing unit and a further one of the registers is arranged to hold information defining the base and limit addresses of an information segment which contains a master capability table having an entry for each information segment in the storage unit composed of information defining the base and limit addresses of a segment. The segment pointer table comprises a list of data words which are used as pointers to define different entries in the master segment table.

U.S. Pat. No. 4,366,536 shows a digital computer system for selecting and linking multiple separately stored data processing procedures consisting of assembly level commands and for selecting a variable data area from a plurality of variable data areas. The system includes memories for storing the data processing procedures, the variable data areas and linking addresses; a program counter for accessing the memory containing the stored data processing procedures; registers for accessing the memories containing the data and the linking addresses; and a hardware unit which is adapted to execute the assembly level commands contained in selected data processing procedures in accordance with assembly level commands in the data processing procedure being executed and previously selected addresses.

U.S. Pat. No. 4,268,903 shows a stack control register group for controlling a stack area. A data stack pointer register holds the start address of the data stack area which is formed in the stack facility and controlled by the user program directly.

U.S. Pat. No. 4,454,580 entitled "Program Call Method and Call Instruction Execution Apparatus", assigned to the same assignee as the present invention includes a method of passing execution from a program in one logical address space to another program in a new logical address space. The calling program controls selective allocation of segments to the called program but the called program controls the lengths of the segments being allocated. In this way, recursive calls to the same program cannot affect the function or data of other programs or of the same program in a previous call. Also allocation of data segments can be postponed until execution resulting in more flexible execution of programs written without knowledge of the details of other co-executing programs.

U.S. Pat. No. 4,297,743 entitled "Call and Stack Mechanism for Procedures Executing in Different Rings" shows an architecture based on a hierarchy of rings where each ring represents a different level of privilege. Branches are allowed to rings having a lesser privilege and privilege levels are allowed to be different for read only status as opposed to read and write status. The patent shows a stack frame which has three areas: a work area for storing variables, a save area for saving the contents of registers and a communications area for passing parameters between procedures. Prior to a procedure call, the user must specify those registers to be saved and the user must load into the communications area the parameters to be passed to the called procedure. The system provides for a history of calls in a sequence of stack frames so that a return can be accomplished. Finally, U.S. Pat. No. 4,044,334 entitled "Database Instruction Unload" shows a system for retrieving a database pointer for locating database records in one of a plurality of segments of addressable space.

An article in the IBM Technical Disclosure Bulletin, January 1982, Vol. 24, No. 8, pages 4401-4403 entitled "Method of Revoking a Capability Containing a Pointer-Type Identifier Without Accessing The Capability" deals with an Address Space Number (ASN) as a pointer-type identifier for the address space capability. This publication relates to the dual address space facility and the fact that an address space does not have to be entered to determine if the access is valid since that information may be determined using the ASN-second-table entry (ASTE) associated with address translation. In general, access to an object by means of the capability is permitted only when the unique codes in the capability and the object are equal. The capability can be revoked simply by changing the unique code in the object without the need to locate and access the capability.

While the prior art previously discussed represents significant advancement in function for the computer user, there are significant areas in which improvement is desired. In particular, there is a need for a facility to move data between arbitrary address spaces. In addition, there is a need for a facility to control an authorization index for programs in a space so that different authorization indexes can be used in the same space. Finally, there is a need to improve the ability to switch frequently between address spaces and to acquire or relinquish the additional addressing capabilities on the switch of addressing environments. Control and authority mechanisms are important considerations. The contents of an AR should be changeable by the user; however, the user should not have direct access to actual addressing information such as the STD. Thus, there is a need to combine ease of use of address space mechanisms with the proper authority and control mechanisms to prevent unwanted access to address spaces. As will be described, the present invention provides improved performance in meeting these needs.

SUMMARY OF THE INVENTION

This invention is a data processing system which has multiple virtual address spaces under system control and in which the user's management of the address spaces is by means of tokens provided by the system for identifying the spaces. The tokens allow the user to identify the address spaces to be accessed to the system but do not allow the user to directly control either real or virtual address spaces. Thus, the system provides proper authority and control over access to address spaces so that the user cannot directly work with a system managed resource. The user also has the option of selecting among operating modes as to which addressing system of several possible is invoked.

In a computer system according to the present invention, an access register (AR) is provided to correspond to all of the general purpose registers that exist for users in the architecture. In AR mode, each access register contains an access list entry token (ALET) to signify an address space for which the general purpose register is to be allowed access. The ALET points to an access list entry (ALE). Dynamic address translation (DAT) is to occur using the operand in the general purpose register for the address space signified by the ALET. The process of obtaining the STD using access register translation (ART) is a two step process. First, the ALET is used to identify an access list entry in an access list which contains an address space number second table entry address (ASTE ADR). Then the ASTE ADR is used to access the ASTE which contains the STD used in dynamic address translation (DAT). Certain tests are performed using the components of the ALET, the access list and the ASTE before the STD is obtained from the ASTE.

The ART includes reliability, integrity and authority checks. When the ALET in the access register is first used to find the correct access list entry (ALE) in an access list, verification occurs to determine that the entry is valid. Then the contents of the ALE are used to find the correct ASTE from which the STD is obtained. In addition, an ASTE sequence number (ASTESN) comparison is made between the contents of the ALE and the ASTE to verify the correctness of the reference to the ASTE.

These comparisons have to do with the use of a capability as defined in the computer arts. A capability is an unforgeable object which allows its possessor to perform operations on another object. In the case of access registers, the capability deals with objects which are address spaces. If an access register were allowed to directly contain the capability, that is the STD for the address space, the AR contents would have to be manipulated solely by privileged instructions in order to maintain the unforgeable characteristic. The use of privileged instructions for address space control takes extra time and computer resource because it requires passing control between the problem state program and the privileged control program.

An access list contains the maximum potential addressability to address spaces at one time. The ART process further includes the determination of the authority level of an ALE that may limit the maximum addressability by authority tests. All program code operates under some predetermined authority level and access to an ALE is controlled by authority tests. There are three levels of tests. The first level is the public/private bit in the ALE. If it is public, any user of the access list may use the entry. If it is private, the second level test is that an extended authorization index (EAX) in control register 8 must be the same as an authorization index (ALEAX) associated with the accessed address space in the ALE. Control register 8 specifies the space accessing authority of the executing program. This is in effect the owner of a controlled space accessing the space. Finally, a third test is performed if the EAX does not equal the ALEAX. An authority table of the accessed ASTE is indexed by the EAX value from control register 8. If the particular EAX finds an allowed access in the authority table then the access is permitted. This is the equivalent of the owner of a space allowing special usage.

An advantage of the present invention is that ARs contain ALETs which allows address space control without use of privileged instructions. Because the AR contains an ALET which specifies a space indirectly through an access list entry, an unprivileged instruction or subroutine can save access register contents, use the access register for another purpose and then restore the saved contents without using a control program service. Thus, the access list controls the authority of the user. The reason the access list entry points to the ASTE which contains the STD, rather than the access list entry directly containing the STD is that control and authority over address spaces may be modified by manipulating the ASTE without having to find all the access list entries referencing the space. The address space second table (AST) provides a definition of all program address spaces in the system so that the system has a central point of control for all address spaces. Many users may have access to an address space and should have that space in their access list to do so. More than one ALE in more than one access list can point to the same ASTE. Thus, there are two levels of indirection between the AR and the STD which allow separate control of the user's capability and of the authority to address spaces.

As a further example of the control that is facilitated by the use of indirection between the AR and the STD, the management of real addresses in which the system places STD information is much simpler. Segment table origins are identified by real addresses and are usually on a page boundary. The segment table itself usually occupies full real frames of memory. Thus, it is important that when an address space is swapped out of main storage or is terminated, the real frames that map its segment table be reusable to map other segment tables or other virtual addresses. This requirement is met by the use of the ASTE which is the only place the control program needs to update information before reusing the real address in the STD.

The selected access list may be from one or more available domains. For example, the disclosed embodiment shows both a dispatchable unit domain (DUAL) and a primary address space domain (PSAL). Although an access list is associated with either a dispatchable unit or a primary address space, the valid entries in the list are intended to be associated with the different programs that are executed to perform the work of the dispatchable unit. The DUAL is used in the sense that it belongs to the user and can be different for different users even when executing the same program. The PSAL is used in the sense that it is common to a program executing in the associated primary address space regardless of dispatchable unit. Two principal advantages are gained by the primary address space domain. First, all users of the primary space domain have the capabilities of the domain without having to individually assign or acquire the capability to the dispatchable unit domain of every user. Second, a dispatchable unit may acquire capabilities by switching primary address space domains without having to separately acquire those capabilities.

The dispatchable unit access list (DUAL) contains the maximum potential addressability of all code running under the dispatchable unit regardless of what address space that code is in, while the PSAL contains the maximum space addressability of all code running in a particular address space regardless of what dispatchable unit it is running under. In either case, the ART process is subject to the EAX authority check. As an example, this allows a program to call a service in another address space allowing communication in a public address space while that service is forbidden access to the calling space itself for integrity or privacy reasons. Since a program call (PC) can change the EAX, this is easy to accomplish. Even though the access list is usable in the service address space, the entry for the private space can be blocked from access while the dispatchable unit is in the second space.

In addition, the present invention includes the provision of an ART lookaside buffer (ALB) that reduces the number of references to storage for the ALD, ALE, ASTE and the authority table which otherwise must occur every time the associated GPR contains a storage operand reference. Because the number of storage references during ART can be quite high, the use of an ALB to provide the results of the ART function means that the access register functions can be provided with an efficient use of computer resources.

When the ALB is used, the CPU performs an ART process in real storage only for the initial access using that AR entry. The information from the ART process is placed in the ALB, and subsequent ART operations are performed using the information in the ALB, unless that information has become invalid, or been replaced by the results of other ART operations. The ALB also provides required authority checks before producing an output. The presence of the ALB affects ART to the extent that a change to the contents of information used to perform ART in real storage does not necessarily have an immediate, if any, effect on whether an STD is obtained or on which STD is obtained from the ALB.

The ALB is logically a table, local to a CPU, consisting of some number of entry types and some number of entries of each type. The most complex implementation of an ALB provides the highest probability that one or more ALB entries will be usable in a particular instance of ART and, thus, that one or more references to real storage can be avoided in that instance. The most simple implementation of an ALB provides the lowest probability of avoiding references to real storage.

A linkage stack facility permits programs operating at arbitrarily different levels of authority to be linked directly without the intervention of the control program. The degree of authority of each program in a sequence of calling and called programs may be arbitrarily different, thus allowing a non hierarchical organization of programs to be established. Options concerning authorities for the EAX changing option and the PSW key changing option as well as those for the PSW key mask and the secondary address space provide means of associating different authorities with different programs or with the same called program. The authority of each program is prescribed in the entry tables and these tables are managed by the control program. By setting up the entry tables so that the same program can be called by means of different PC numbers, the program can be assigned different authorities depending on which PC number is used to call it. The entry tables also allow control over which PC numbers can be used by a program to call other programs.

Stacking PROGRAM CALL and PROGRAM RETURN linkage operations provided by the linkage stack facility can link programs residing in different address spaces and having different levels of authority. The execution state and the contents of the general registers and access registers are saved during the execution of a stacking PROGRAM CALL instruction and are partially restored during the execution of a PROGRAM RETURN instruction. A linkage stack provides an efficient means of saving and restoring both the execution state and the contents of registers during linkage operations.

IN THE DRAWINGS

FIG. 1 is a diagrammatic illustration of the use of an access register in addressing operands according to the present invention;

FIG. 2 is a diagrammatic illustration of an access register translation of contents of an access register of FIG. 1;

FIG. 3 depicts the organization and contents of the control registers for use with the MAS facility of the present invention;

FIG. 4 depicts the contents of the PSW for use with the MAS facility;

FIG. 5 depicts the format of an access-list-entry token for use with the MAS facility;

FIG. 6 depicts the format of an access-list entry for use with the MAS facility;

FIG. 7 depicts the format of a linkage-table entry according to the present invention;

FIG. 8 depicts the format of an entry-table entry for use with the MAS facility;

FIG. 17 is a diagrammatic illustration of the logic flow of an ASN translation of a PROGRAM CALL operation;

FIG. 18 is a diagrammatic illustration of the logic flow of an access register translation of FIG. 2;

Figure 20:
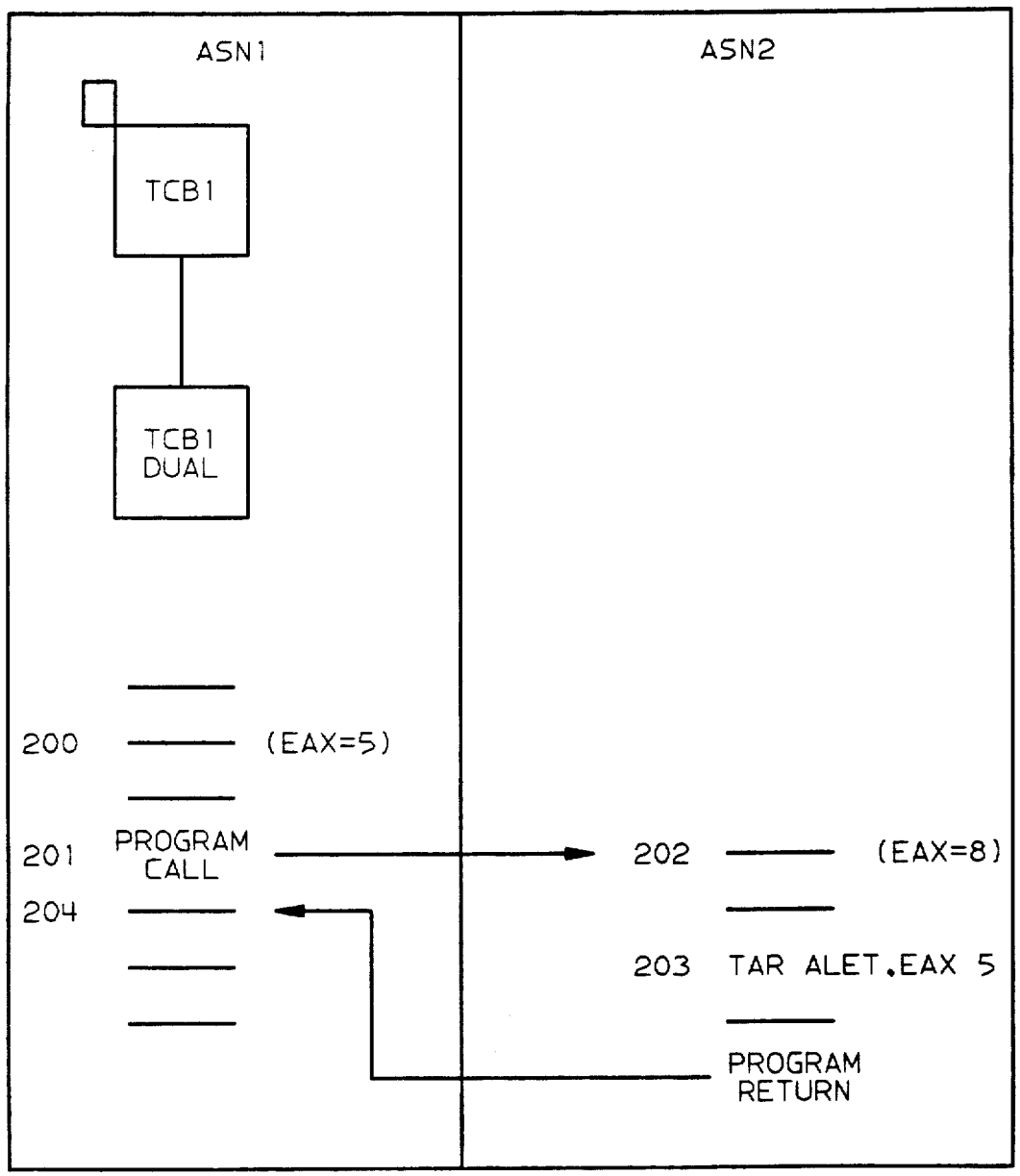
Figure 25:
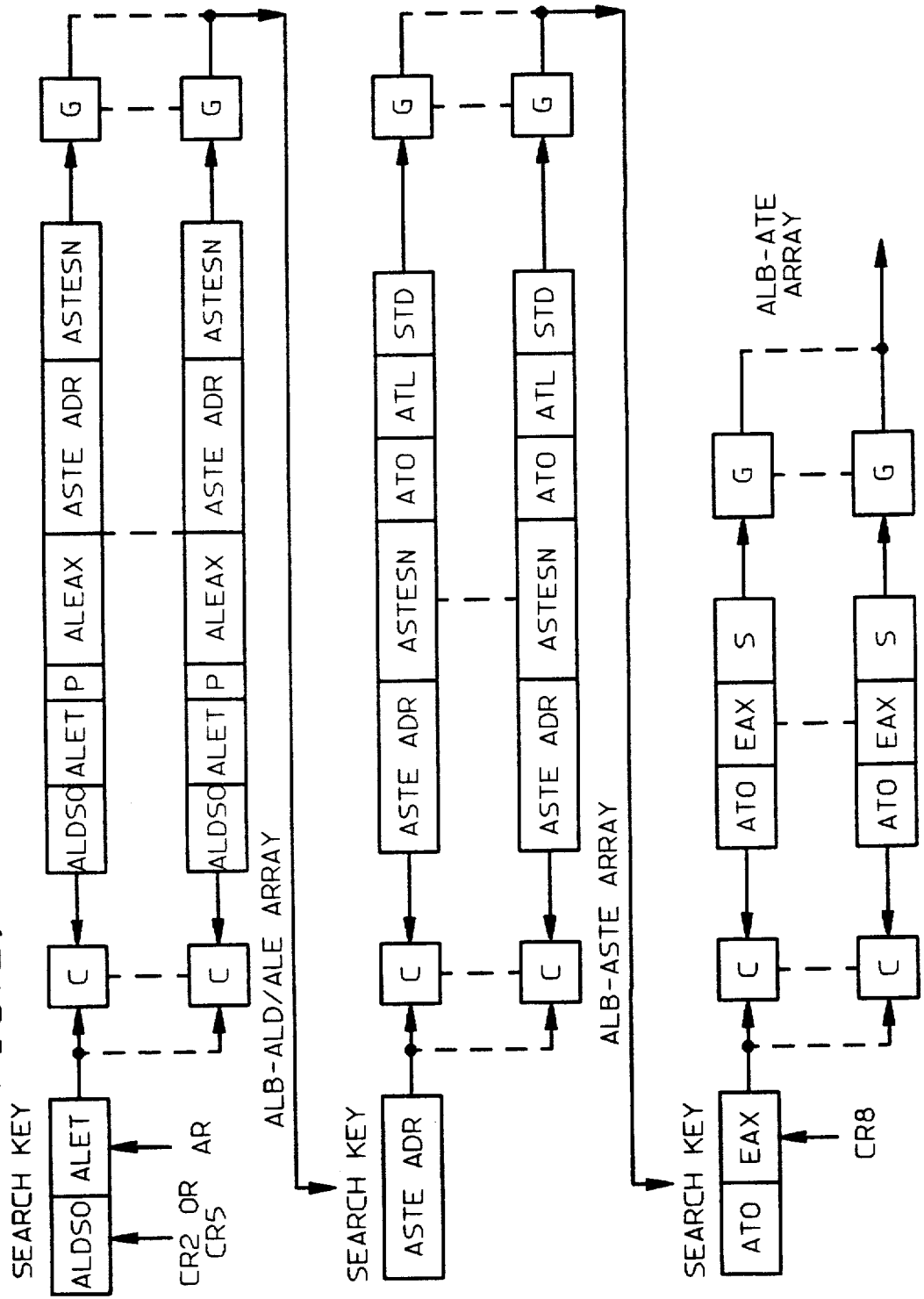

FIGS. 19A and 19B, when taken together, form a flow chart of an access register translation operation and exceptions;

FIG. 20 is an illustration of the use of the TEST ACCESS REGISTER instruction for use with the MAS facility;

FIG. 21 shows a first embodiment of an ALB entry according to the present invention;

FIG. 22 shows a second embodiment of an ALB entry according to the present invention;

FIG. 23 shows a third embodiment of an ALB entry according to the present invention;

FIG. 24 shows a fourth embodiment of an ALB entry according to the present invention; and FIG. 25 shows a fifth embodiment of an ALB according to the present invention in which the ALB entries and authority are determined in separate tables.

DESCRIPTION OF THE PREFERRED EMBODIMENT

The multiple address space (MAS) facility of the present invention is an enhancement of the dual address space facility and of the access register system. The MAS facility is designed to run compatibly with, and in addition to, the DAS facility and, for the most part, to use the same tables and register arrangements as the DAS facility, with certain changes and enhancements. The access register translation (ART) system is an improvement which allows full use of the access register system by the user while providing isolation and protection of machine addressing functions from the user. The use of an ART lookaside buffer (ALB) enhances the performance of ART.

A service provider typically owns one or more address spaces containing data or programs, or both, which the service provider wants to make available to users. The service provider makes programs available to users by assigning them program call (PC) numbers. This assigning operation includes establishing links for transferring program control, specifying the authorization characteristics needed by the service callers, and assigning the authorization characteristics of the service provider's programs. The transfer of program control may be from one address space to another or may remain in the same address space. In either case, it may change the authorization from one level to another to provide greater, lesser or different authorization. The service provider may run with an authorization level different than the caller's level, allowing the service provider routines to access data in address spaces which the caller cannot access. The user and service provider can access all spaces on the access list which have not been designated as private address spaces. Additionally, the service provider can have access to selected address spaces which the user cannot access. Similarly, the service provider can be denied access to selected address spaces which the user can access.

The execution of a program instruction may be conveniently divided into two operations. The first operation is the fetching of the instruction to be executed. The second operation is the addressing of operands for the fetching and storing of data on which the instruction operates during its execution. In MAS in the AR mode, the instruction is fetched from that address space established as its primary address space. The establishment of the primary address space may require a space switching operation.

FIG. 1 shows the use of an access register according to the present invention in addressing operands. The process of using the contents of an access register to obtain a STD for use in a dynamic address translation, is called an access-register-translation (ART) operation, which is generally designated at 10. An instruction 12 has an operation code, a B field which designates a general register 14 containing a base address, and a displacement D, which, when joined with the base address of general register 14 by an adder 15, forms a logical address of a storage operand. In the access register mode, the B field also designates an access register 16 which contains an ALET which, when translated at ART 10, provides the STD for the address space in which the data is stored. The STD from the ART 10 may be joined with the logical address from the adder 15, and, when translated together in the dynamic address translation (DAT) operation, designated generally at 18, provides the real address of the operand for use by the system. In addition to the B field and displacement D shown in FIG. 1, an R field may be used for designating a general register containing a logical address of a storage operand.

The use of an access register of the present invention may be further illustrated by the following move (MVC) instruction:

MVC 0(L,1),0(2)

The second operand of this instruction, having length L, is to be moved to the first-operand location. The logical address of the second operand is in general register 2, and the logical address of the first-operand location is in general register 1. The address space containing the second operand is specified by the ALET in access register 2, and the address space of the first-operand is specified by the ALET in access register 1. These two address spaces may be different address spaces, and each may be different from the current instruction address space.

FIG. 2 provides an overview showing the translation of an ALET to a real address. Shown at 20 is an array of general registers numbered 0 through 15. An array 22 of access registers, also numbered 0 through 15, are arranged such that each access register is paired with a respective one of the general registers of array 20, as previously described in connection with FIG. 1. An access-list entry number (ALEN) in the ALET selects an entry in one of the access lists 24 or 25. Access list 24 is the DUAL, and access list 25 is the PSAL. In the example of FIG. 2, the ALEN of access register 2 points to entry 3 of the PSAL 25. The origin of the DUAL is specified by a dispatchable-unit-access-list designation (DUALD) 26 which is found by decoding an entry in control register 2, as will be explained. The origin of the PSAL is specified by a primary-space-access-list designation (PSALD) 27 which is found by decoding an entry in control register 5, as will be explained. The access-list designation used in the ART is known as the effective access-list designation (ALD).

Each entry in the access list includes an ASTE address which points to an ASN second table entry (ASTE) 98 which may or may not be in an ASN second table (AST) 30. An ASTE may be created and perform its function for ART totally independently of actually being in an AST, although ASTEs used for PC are required to be in an AST. Each ASTE is similar to that used in the DAS facility, and includes an STD value to determine the real address by the DAT 18, as discussed in connection with FIG. 1.

There are two access lists available to a program at the same time each representing a different capability domain. One access list is called the dispatchable unit access list (DUAL) and the other primary space access list (PSAL). A bit in the ALET determines whether the ALEN of the ALET is pointing to an entry in the DUAL 24 or the PSAL 25. Each entry in the access lists 24 and 25 is available for use by programs.

The DUAL domain is intended to be permanently associated with the dispatchable unit ("task" or "process") on behalf of the program or programs executed by the dispatchable unit. There is a unique DUAL for every dispatchable unit in the system. The DUAL for a dispatchable unit does not change even though the dispatchable unit may execute programs in many different address spaces. The PSAL domain is associated with a primary address space. All programs which execute in a primary address space share the PSAL of the address space. This allows programs executing within a primary space to share access to a common set of address spaces. The PSAL changes when the primary address space changes such as on a space switching PC operation. A user, in possession of a valid ALET, may access an access list entry on either the DUAL 24 or the PSAL 25, and this entry specifies the desired address space. Other domains may also be implemented and controlled in a similar manner using the ALET and selected control registers. For example, a system wide access list (SWAL) domain may be created having the capabilities of all programs in the system. Various subsets of domains can be constructed as desired, such as a SASN domain access list (SSAL), to allow further exploitation of an existing mechanism.

Entries 0 and 1 of the DUAL are not used because the ALETS are reserved for accessing operands in the primary and the secondary address spaces, respectively, when in the AR addressing mode. The addressing mode of the CPU is designated by bits in the PSW, as will be explained. When the CPU is in the AR addressing mode, an ALET of zero always refers to the primary address space and an ALET of one always refers to the secondary address space. See FIG. 1 in which box 28 identifies these special ALETS and provide the correct STD for the PASN and the SASN to DAT when they occur. When the CPU is in the home addressing mode, the home address space is the source of instructions to be executed and of data. The home address space is defined as that address space having the supervisor control information for the program being executed. By convention, the operating system assigns an ALEN of 2 for each home space for the purpose of data access and the STD for the home space is obtained by ART for such access. Since the STD values for the primary and the secondary address spaces are kept in control registers 1 and 7, respectively (see FIG. 3) access list entries 0 and 1 are not used. As implemented, entries 0, 1 and 2 in the PSAL 25 are unused and are marked invalid.

An ART lookaside buffer (ALB) 199 receives and saves inputs from the AR 22, the AL 25, and the AST 30 to hold the STD resulting from ART. The ALB also retains the access list designation, DUAL or PSAL. When the same ALET is used again, ALB 199 provides the correct output directly to DAT 18 so that ART does not have to be repeated.

FIGS. 3 and 4 show the control registers and the PSW word, respectively, for providing information for the control of a program and the state of the CPU during instruction execution.

FIG. 3 shows the contents of the control registers 0 through 15 for the MAS facility of the present invention. All of the contents of the control registers of FIG. 3 will not be discussed, as the majority of them have the identical functions of the control registers of the aforementioned DAS facility and are thus known. Thus, primarily those changes necessary to provide the MAS facility will be discussed. A 1 in bit 15 of control register zero indicates the CPU is operating in the MAS mode and the control program supports MAS. The MAS facility includes new formats for the entry table entry, the ASN second table entry, the availability of a linkage stack, and the ability to enter the access register mode. Control register 1 contains the primary segment-table designation (PSTD). Bits 1–19 specify the primary segment-table origin (PSTO) and bits 25–31 designate the primary segment-table length (PSTL). Bits 1–25 of control register 2 designate the dispatchable-unit-control-table origin (DUCTO) used by the MAS facility to locate the DUALD, as will be discussed Bits 1–25 of control register 5 designate the primary ASTE origin (PASTEO). As will be discussed, the entry in control register 5 points to the ASTE entry for finding the PSAL origin, and other information, in the ASTE for the primary address space.

Control register 7 includes the secondary segment-table designation (SSTD) in a format wherein bits 1–19 contain the secondary segment-table origin (SSTO) and bits 25–31 contain the secondary segment-table length (SSTL). Bits 0–15 of control register 8 contain an extended authorization index (EAX) for use by the MAS facility of the present invention. As will be discussed, the EAX may be modified as specified by bit entries in the entry table entry under the control of the service provider such that authorization to access address spaces by a program may be changed.

Control register 13 contains a home segment-table designation (HSTD) wherein bits 1–19 contain the home segment-table origin (HSTO), and bits 25–31 contain the home segment-table length (HSTL). Bits 1–28 of control register 15 contain the address of a linkage-stack entry as defined in the last linkage-stack operation, to be discussed.

FIG. 4 shows the format of the program status word (PSW). Bit 5 of the PSW is a DAT mode bit (T) which defines if the DAT 18 of FIGS. 1 and 2 is active. Bits 16 and 17 are combined to specify the addressing mode. When the DAT is active, the combination of bits 16 and 17 define if the CPU is in the primary mode (00), the secondary mode (10), the access register mode (01), or the home mode (11). Bit 32 of the PSW is an addressing mode bit which defines the format of the instruction address in bits 33 through 63 of the PSW. The function and format of the remainder of the fields in the PSW are well understood and defined for IBM System/370 Operations.

FIGS. 5 and 6 show the format of the ALET and the access list entry for defining the relationship of an access register and an address space.

FIG. 5 shows the format of the ALET discussed in connection with FIG. 2. In the ALET, bit 7 is a primary-list bit which, when 1, indicates that the ALEN refers to a PSAL. When the primary-list bit 7 is 0, the ALEN refers to the DUAL. Bits 16–31 contain the ALEN referred to in FIG. 2. When the ALEN is multiplied by 16, the product is equal to the number of bytes from the beginning of the effective access-list to the designated access-list entry. During the ART, an exception is recognized if the ALEN designates an entry that is outside of the effective access-list or if the left most 7 bits of the ALET are not all zeroes. The access-list entry is outside of the effective access list if the ALEN points to an address past the end of the access-list as determined by the access-list length (ALL) of the effective ALD. See FIG. 14 for the ALL. The described format of the ALET does not apply when the ALET is 00000000 or 00000001 (hexadecimal notation), since these values have been assigned a special meaning by the ART process.

An ALET can exist in an access register, in a general register or in storage, and it is not protected from manipulation by a user's problem program. Through the use of instructions, any program can transfer the value of an ALET back and forth between access registers, general registers and storage. A called program can save the contents of the access registers in any storage area available to it, load and use the access registers for its own purposes, and then restore the original contents of the access registers before returning to its caller. Bits 8–15 of the ALET contain an access-list-entry sequence number (ALESN). Since the ALET is not protected from the problem program, and a user may inadvertently change its contents to any value, the ALESN is included in the ALET as a reliability mechanism that is checked during an ART.

FIG. 6 depicts the format of an access-list entry (ALE). Bit 0 of the ALE is an invalid bit which indicates when the ALE is not valid. Bit 7 is a private bit which, when 0, specifies that any program is authorized to use this access-list entry in an ART operation. When bit 7 is 1, an access-list extended authorization index (ALEAX) value in bits 16–31 of the ALE is used to determine if a calling program is authorized to use this access-list entry. The ALE includes an ALESN value in bits 8–15, which is compared to the ALESN value of the designating ALET, as discussed in connection with FIG. 5, to make a validity check. Bits 65–89 of the ALE contains the corresponding ASTE address of the associated address space. An ASTE sequence number (ASTESN) is located in bits 96–126 of the ALE for use as a validity check in connection with the ASTE entry, to be discussed.

It is intended that entries on the access-lists 24 and 25 be provided by the control program such that they may be protected from direct manipulation by any problem program. This protection may be obtained by means of key-controlled protection or by placing the access-lists in real storage not accessible by any problem program by means of the DAT. As determined by bit 0 in the entry, an ALE is either valid or invalid. A valid ALE specifies an address space that can be used by a suitably authorized program to access that address space. An invalid ALE is available for allocation, or reallocation, as a valid entry. The control program provides services that allocates valid ALEs and that invalidates previously allocated ALEs.

Allocation of an ALE consists of the following steps. A problem program passes the identification of an address space to the control program, and it also passes an indicator specifying either the DUAL 24 or the PSAL 25. This indication is the primary list bit 7 of the ALET. The control program then checks the authority of the problem program to access the address space, as will be explained. If the problem program is authorized, the control program selects an invalid entry in the specified access list, changes it to a valid entry, includes the ASTE address and ASTESN thereby specifying the subject address space, and returns to the problem program the value of an ALET which designates the now allocated ALE. The problem program can then place the new ALET in an access register in order to access the address space. Later, through the use of the invalidation service of the control program, the ALE that was allocated may be made invalid.

In this way, a particular ALE may be allocated, then invalidated, and then reallocated, this time specifying a different address space then was specified in the original allocation. To guard the user against erroneous use of an ALET that designates a conceptually wrong address space, the ALESN is stored in both the ALET and the ALE. When the control program allocates an ALE, it places the same ALESN in both the ALE and the designated ALET that it returns to the problem program. When the control program reallocates an ALE, it changes the value of the ALESN in the reallocated ALE such that the value of the ALESN of previously designated ALETs no longer matches the ALESN in the new ALE.

Although the ASTESN portion of the ALE will be discussed further in connection with the ASTE and the associated figures, it is important to note here that comparison of the ASTESN value in the ALE with the value in the ASTE is the mechanism by which the ALE authority to designate the ASTE is confirmed. Thus, an ASTE can be reassigned and a different ASTESN assigned to control its use without having to back track to all ALE entries which have referenced the ASTE. Through use of the ASTESN the control program does not have to retain every program or dispatchable unit which was able to use the ASTE. Thus, the authority can be changed by changing the ASTESN and exceptions or interruptions generated when an attempt is made to use the ASTE without the proper ASTESN. This allows the operating system to be made aware of attempts to access the ASTE with a capability granted in an ALE at a time before the ASTESN was changed. Thus, an operating system has a mechanism to safely reuse an ASTE for a new and/or different space, or to revalidate the authority of the current accessors of an existing space to use it.

Figure 10:
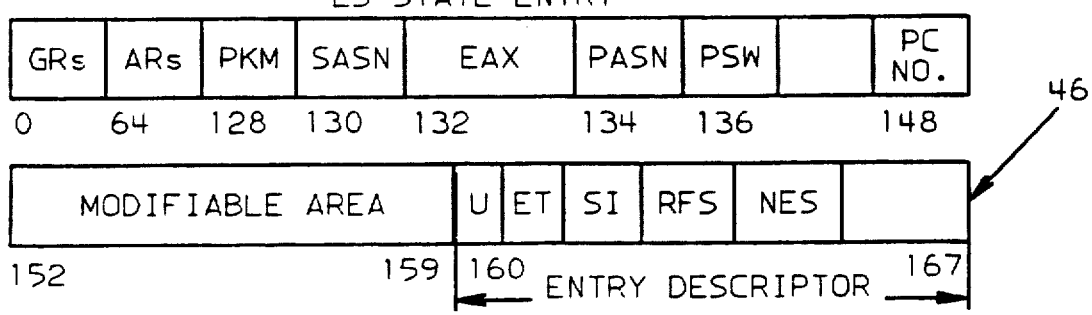
FIG. 10 depicts the format of an entry of the linkage stack of FIG. 9.

FIGS. 7, 8 and 10 depict the formats of entries in the linkage table, the entry table and the linkage stack, respectively. These tables are used according to the present invention to establish linkage for transferring control between programs in either the same or different address spaces.

As previously described, a PC number identifies the particular PC routine that the system is to invoke and is constructed by a service provider. Each service provider that provides PC routines owns one or more entry tables for defining the service provider's routines. The entry tables are connected to linkage tables of those address spaces that require access to the PC routines. Each entry in an entry table defines one PC routine, including its entry point, operating characteristics, and if the PC instruction is a stacking PC. FIG. 7 depicts the format of a linkage table entry, wherein each entry includes an invalid bit at bit 0, an entry table origin (ETO), and an entry table length (ETL), which together define an entry-table designation.

FIG. 8 depicts the format of the entry of the entry table pointed to by the linkage-table entry of FIG. 7. Bits 0–15 of the entry-table entry contain an authorization key mask (AKM) which is used to verify whether the program issuing the PC instruction, when in the problem state, is authorized to call this entry point. Bits 16–31 contain an entry address-space number (EASN) which indicates whether a PC-ss or a PC-cp is to occur. When the EASN is all zeroes, a PC-cp is specified. When the EASN is not all zeroes, a PC-ss is specified, and the EASN identifies the address-space number (ASN) which replaces the primary ASN (PASN). Bit 32 is an addressing mode bit that replaces the addressing mode bit in the PSW as part of the PC operation. The entry instruction address is the instruction address that replaces the instruction address in the PSW as part of the PC operation. Bit 63 is an entry problem state bit which replaces the problem state bit, bit 15 of the current PSW, as part of the PC operation. Bits 64–95 are an entry parameter which is placed in general register 4 as part of the PC operation. Bits 96–111 is an entry key mask (EKM) which may be ORed into or replace the contents of control register 3, dependent upon the value of the M bit, as will be explained. Bit 128 is a PC-type bit (T) which, when 1, specifies that the program call instruction is to perform a stacking operation. Bit 131 is a PSW-key control (K) which, when 1, specifies that the entry key (EK) of bits 136–139 is to replace the PSW-key in the PSW as part of the stacking PC operation. When the K bit is 0, the PSW key remains unchanged. Bit 132 is a PSW-key-mask control (M) which, when 1, specifies that the EKM is to replace the PSW-key mask in control register 3 as part of the stacking PC operation. When this bit is 0, the EKM is ORed into the PSW-key-mask in control register 3 as part of the stacking PC operation. Bit 133 is an extended-authorization-index control (E) which, when 1, specifies that the entry EAX of bits 144–159 is to replace the current EAX in control register 8 as part of the stacking PC operation. When the E bit is 0, the current EAX in control register 8 remains unchanged. Bit 134 is an address-space-control control (C) which, when 1, specifies that bit 17 of the current PSW is to be set to 1 as part of the stacking PC operation. When this bit is 0, bit 17 of the current PSW is also set to 0. Because the CPU must be in either the primary-space mode or the access-register mode when a stacking PC instruction is issued, the result of this C bit is that the CPU is placed in the access-register mode if bit 134 is 1 or the primary-space mode if bit 134 is 0. Bit 135 is a secondary-ASN control (S) which, when 1, specifies that the EASN of bits 16–31 are to become the new secondary ASN, and a new secondary segment-table designation (SSTD) is to be set equal to the new primary segment-table designation (PSTD), as part of the stacking PC-ss operation. When this bit is 0, the new secondary address-space number (SASN) and SSTD are set equal to the old primary address-space number (PASN) and PSTD, respectively, of the calling program. When the EASN is not all zeroes, the ASTE address of bits 161–185, with six zeroes appended on the right, forms the real ASTE address that results from applying the ASN translation of the EASN. It will thus be seen that the EASN and ASTE address entries in the entry-table entry point to an entry in the AST 30 which contains the STD, as shown in connection with FIG. 2. It is unpredictable whether an ASN translation of the EASN is performed to obtain an ASTE address, or whether the ASTE address of bits 161–185 is used to locate its designated ASTE. The CPU may do the latter to achieve improved performance.

Figure 9:
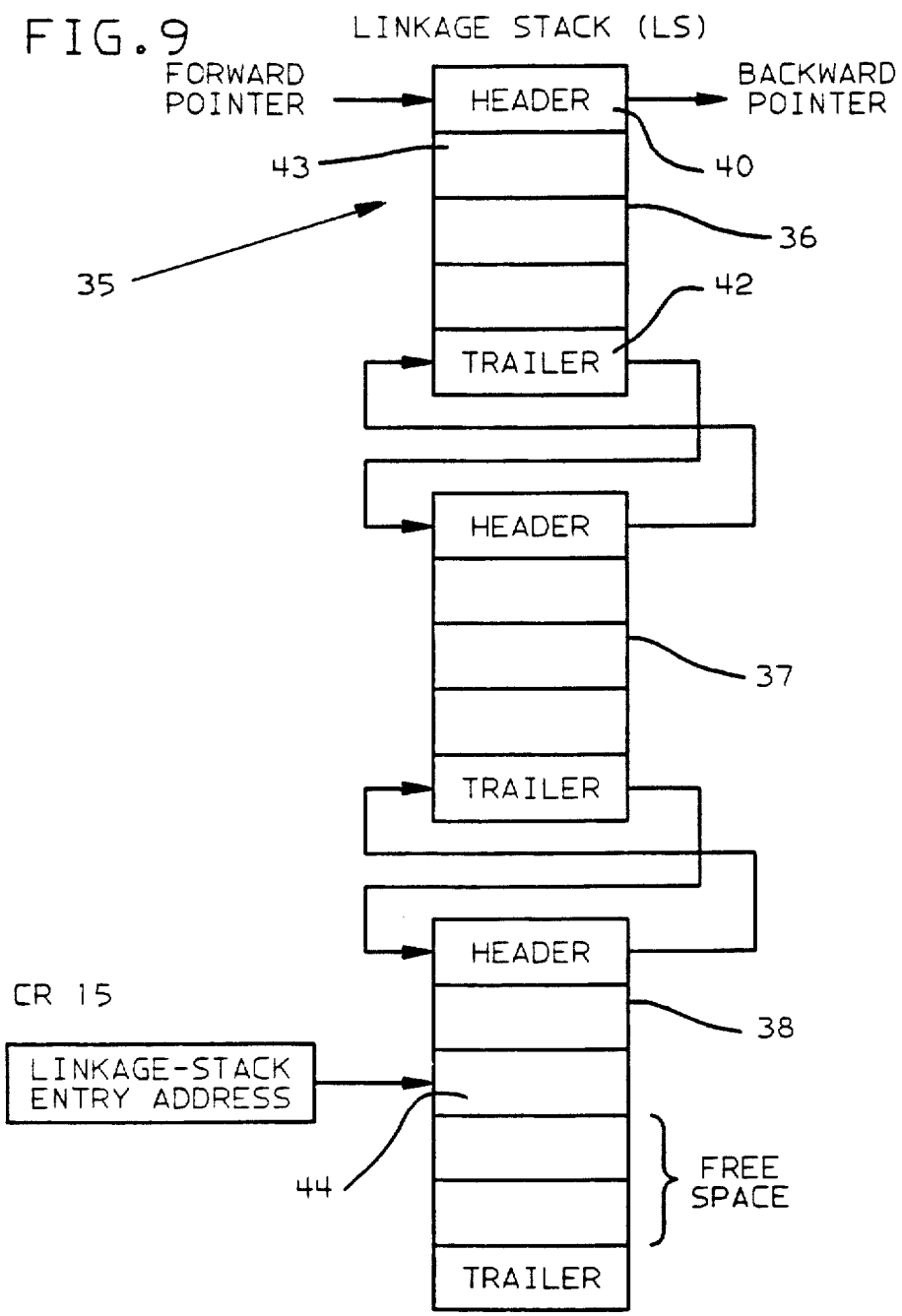
FIG. 9 is a diagrammatic illustration of a linkage stack for use with the MAS facility.

FIG. 9 shows a linkage stack 35 which may be formed by the control program for each dispatchable unit. The linkage stack is used to save the execution state and the contents of the general-registers and access-registers during a stacking operation. The linkage stack is also used to restore a portion of the execution state and the general-register and access-register contents during a return operation. A linkage stack resides in virtual storage, with the linkage stack for a dispatchable unit in the home address space for that dispatchable unit. As discussed in connection with the control registers of FIG. 3, the home address space is designated by the HSTD in control register 13. This protects the linkage stack information and allows recovery of the linkage stack information in the event of a failure in the users address space.

The linkage stack is intended to be protected from problem-state programs so that these programs cannot examine or modify the information saved in the linkage stack except by means of specific extract and modify instructions. The linkage stack 35 may consist of a number of linkage stack sections 36, 37 and 38 which are chained together by forward pointers and backward pointers.

There are three types of entries in the linkage stack: header entries 40 having a backward pointer, trailer entries 42 having a forward pointer, and state entries 43 (see linkage stack section 36). A header entry and a trailer entry are at the beginning and end, respectively, of a linkage-stack section, and are used to chain linkage-stack sections together. Header entries and trailer entries are formed by the control program, and a state entry is added to contain the execution state and register contents that are saved in the stacking operations. The linkage-stack-entry address in control register 15 points to either the current state entry 44 or, if the last state entry in a section has been unstacked, to the header entry for the current section. FIG. 10 depicts the contents of a linkage-stack state entry which, for a stacking PC instruction, contains the contents of the general registers, the contents of the access registers, the PSW key mask, the secondary address space number, the EAX from control register 8, the primary address space number, and the contents of the PSW, all at the beginning of the stacking instruction, and the PC number used. In the case of a BRANCH AND STACK instruction (to be explained), the addressing mode bit and the branch address are saved rather than the PC number.

Each type of linkage-stack entry has a length that is a multiple of eight bytes. A header entry and trailer entry each has a length of 16 bytes. A state entry has a length of 168 bytes (as shown by the numbers in FIG. 10). Each type of entry has an eight-byte entry descriptor at its end (shown at 46 of FIG. 10 for a linkage-stack state entry).

Bit 0 of the entry descriptor is an unstack-suppression bit (U). When bit U is one in the entry descriptor of a header entry or a state entry, a stack-operation exception is recognized during the unstacking process in PROGRAM RETURN. Bit U is set to zero in the entry descriptor of a state entry when the entry is formed during the stacking process.

Bits 1–7 of the entry descriptor are an entry type (ET) code that specifies the type of linkage stack entry containing the entry descriptor. The codes are:

| | |
|---|---|
| 0000001 | Header entry |
| 0000010 | Trailer entry |
| 0000100 | Branch state entry |
| 0000101 | Program call state entry |

Bits 8–15 of the entry descriptor are a section identification (SI) provided by the control program. In the entry formed by a stacking process, the process sets the SI equal to the SI of the preceding linkage-stack entry.

Bits 16-31 of the entry descriptor form the remaining free space (RFS) field which specifies the number of bytes between the end of this entry and the beginning of the trailer entry in the same linkage stack section. Bits 32-47 of the entry descriptor form the next entry size (NES) field which specifies the size, in bytes, of the next linkage stack entry, other than a trailer entry, in the same linkage stack section.

When a new state entry is to be formed in the linkage stack during the stacking process, the new entry is placed immediately after the entry descriptor of the current linkage stack entry, providing that there is enough remaining free space in the current linkage stack section to contain the new entry. If there is not enough remaining free space in the current section, and if the trailer entry in the current section indicates that another section follows the current section, the new entry is placed immediately after the entry descriptor of the header entry of that following section, provided that there is enough remaining free space in that section. If the trailer entry indicates that there is not a following section, an exception is recognized, and a program interruption occurs. The control program then allocates another section, chains it to the current section, and causes the stacking operation to be reexecuted. If there is a following section but there is not enough free space in it, an exception is recognized.

When the stacking operation is successful in forming a new state entry 44, it updates the linkage-stack-entry address in control register 15 so that the address designates the leftmost byte of the entry descriptor of the new entry, which thus becomes the new current linkage-stack entry. When a state entry is created during the stacking process, zeros are placed in the NES field in the created entry, and the length of the created state entry is placed in the NES field of the preceding entry. During a return operation, the contents of the general registers, access registers, and various contents of the control registers are restored from the linkage-stack-state entry 44, and the linkage-stack-entry address in control register 15 is changed to point to the previous linkage-stack entry. When the state entry is logically deleted during the unstacking process of a return operation, zeros are placed in the NES field in the preceding entry. It will thus be understood that the use of the linkage stack allows the operating environment and authorization level of the calling program to be reinstated when program control is returned from the called program by a return instruction. Thus, the linkage operation is both retraceable to the beginning point and enforceable against the user to that invalid changes may not occur.

An ASN number is assigned by the control program for each address space which contains programs. The ASN may be translated during a PC-ss operation as described in connection with the DAS facility. However, since the ASTE address is found in the ETE (see FIG. 8), access to the ASTE may be made directly through the ETE in a PC-ss operation without ASN translation. The control program associates a STD, an AT, and a linkage table with each ASN by placing pointers in the ASTE associated with the address space. Data in these address spaces may also be accessed by having the control program construct an access list entry pointing to the ASTE. Certain address spaces may contain only data, no programs. These address spaces do not have ASNs. In the case of data only spaces, only the ASTE, STD, AT, and ALE are used.

Figure 11:
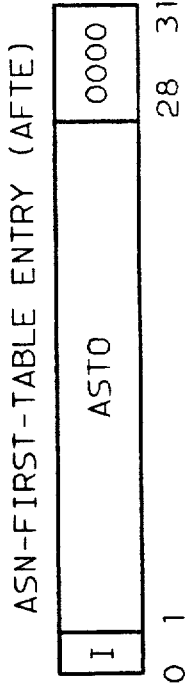
FIG. 11 depicts the format of an ASN-first-table entry.
Figure 12:
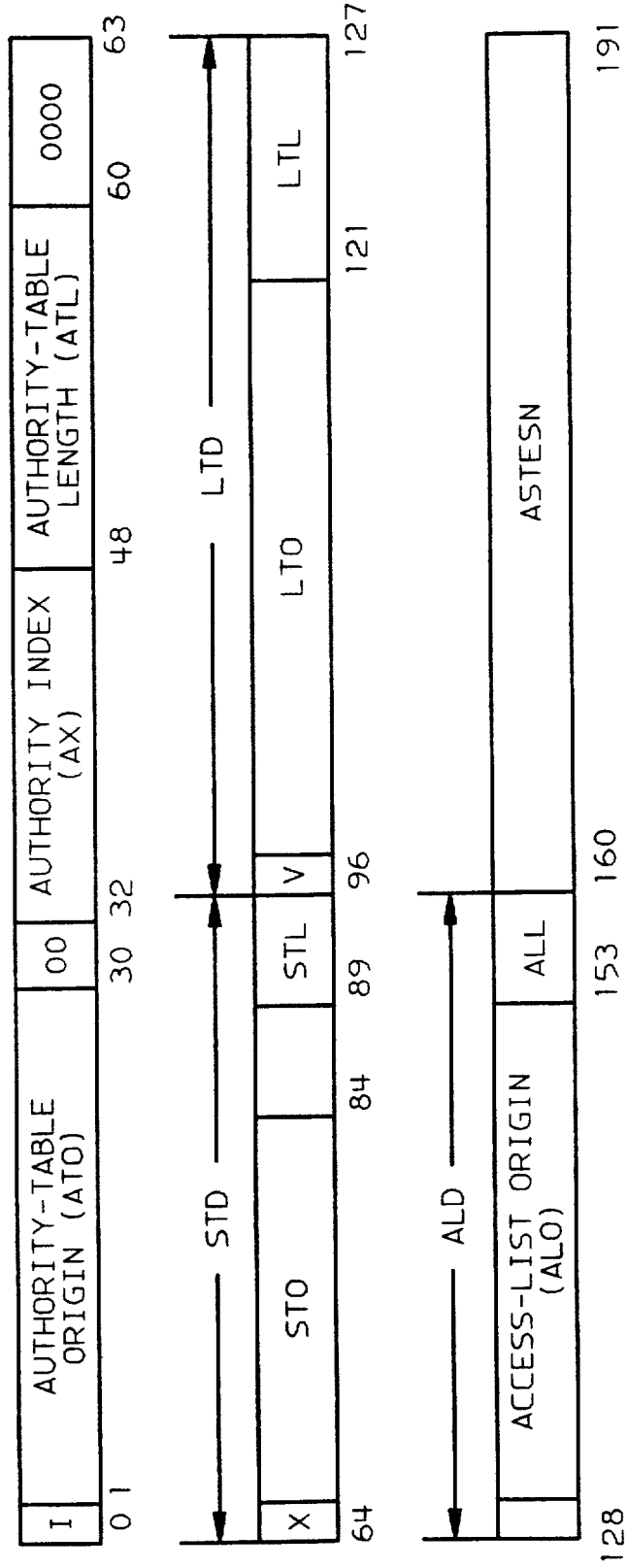
FIG. 12 depicts the format of an ASN-second-table entry according to the present invention.

FIGS. 11 and 12 show the format of entries in the ASN first table and ASN second table, respectively, and are very similar to those of the aforementioned DAS facility. Each entry in the ASN tables of FIGS. 11 and 12 represent an address space and are established by the control program to provide linkage and authorize addressability to the associated address space.

FIG. 12 shows the format of an ASTE. Bit 0 of the ASTE is an invalid bit for indicating the validity of the ASTE. The authority table origin (ATO) and the authority table length (ATL) indicate the authority table designation (ATD) of the associated authority table. Bits 96-127 contain the associated linkage-table designation (LTD) and bits 128-160 contain the associated access-list designation. Bits 160-191 contain an ASTE sequence number (ASTESN) for the ASTE. Since the ASTE may be reallocated as address spaces are created and deleted by the control program, each newly created ASTE has a new, unique ASTESN assigned to it. When an ART operation takes place, the ASTESN in the access-list is compared with the ASTESN in the ASTE as a validity check so that the ASTE may safely be reused for a different address space or different authority.

Figures 13, 14:
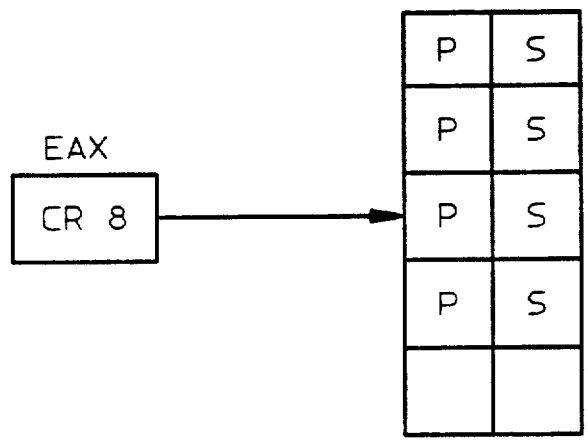
FIG. 13 depicts the format of an entry of an authority table for use with the MAS facility.
FIG. 14 depicts the format of a dispatchable-unit-control table for use with the MAS facility.

FIG. 13 shows an authority table which is associated with each ASTE. As with the DAS facility, each authority table entry has a P bit and a S bit. The entries in the authority table are indexed such that there is one entry in the authority table for each of the values of EAX in use to access the associated address space. As will be discussed, the entry of the authority table which corresponds to the value of EAX in control register 8 may be used to determine if a program is authorized to access the address space associated with the ASTE.

FIG. 14 shows the format of the dispatchable unit control table (DUCT) whose address is located in control register 2, as previously discussed. The dispatchable-unit-access-list designation is stored in bytes 16-19 of the DUCT. The other bytes of the DUCT are not used in the MAS facility, and will not be discussed further.

The PROGRAM CALL instruction has been enhanced to improve the function of the linkage facility. If the T bit, bit 128, of the ETE (see FIG. 8) is one, a stacking PROGRAM CALL operation is performed responsive to a PROGRAM CALL instruction. A stacking PROGRAM CALL (stacking PC) is authorized to enter at a point in an entry table by the authorization key mask in the entry table entry. A stacking PC with space switching, among other operations, may place a new EAX (associated with the new program) in control register 8. The stacking PC saves the contents of general registers 0-15, the contents of access registers 0-15, the complete PSW with an updated instruction address (the return address), the primary and secondary ASNs, the PKM, the EAX, an indication that the entry was formed by PROGRAM CALL, the PC number used, and a two word modifiable area in the entry. The purpose of the modifiable area is to allow a program to "footprint" its progress so that appropriate recovery actions can be taken if a failure of the program occurs.

Two new instructions have been added to improve linkage function:

BRANCH AND STACK
PROGRAM RETURN

The BRANCH AND STACK instruction changes the instruction address in the PSW, and forms a state entry, called a branch state entry in the linkage stack of FIG. 9. The branch state entry is the same as a program call state entry except that it indicates that it was formed by BRANCH AND STACK and contains the branch address instead of the PC number. The BRANCH AND STACK instruction can be used either in the calling program or at (or near) the entry point of the called program. The BRANCH AND STACK instruction at an entry point allows the linkage stack to be used without changing old calling programs.

The PROGRAM RETURN instruction is used to return from a program given control by means of either a stacking PROGRAM CALL or a BRANCH AND STACK instruction. PROGRAM RETURN logically deletes the last linkage-stack state entry, which may be either a program call state entry or a branch state entry. If the last state entry is a program call state entry, PROGRAM RETURN restores all of the state information that was saved in the entry, and the contents of general registers 2-14 and access registers 2-14. General and access registers 0, 1 and 15 are unchanged by PROGRAM RETURN. If the last state entry is a branch state entry, PROGRAM RETURN restores only the complete PSW (subject to one exception noted) and the contents of general registers 2-14 and access registers 2-14. However, the PER mask bit R, FIG. 4, is not restored by the PR operation. The combination of a stacking PROGRAM CALL and a PROGRAM RETURN permits non hierarchical program linkage, that is, linkage from a program with some amount of authority to a program with less, more or completely different authority.

Figure 15:
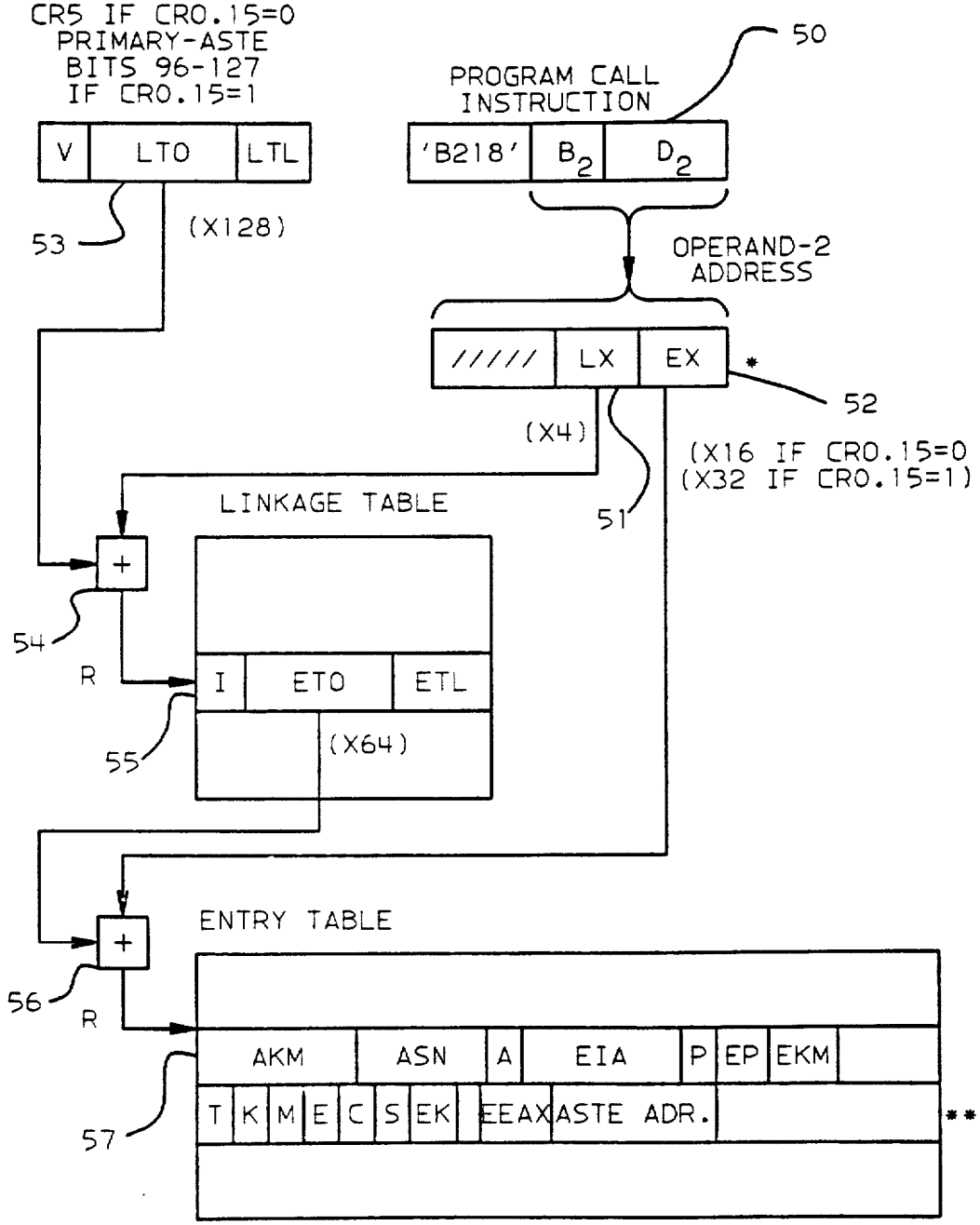
FIG. 15 is a diagrammatic illustration of the logic-flow of a PC number translation of a PROGRAM CALL operation.
Figure 16:
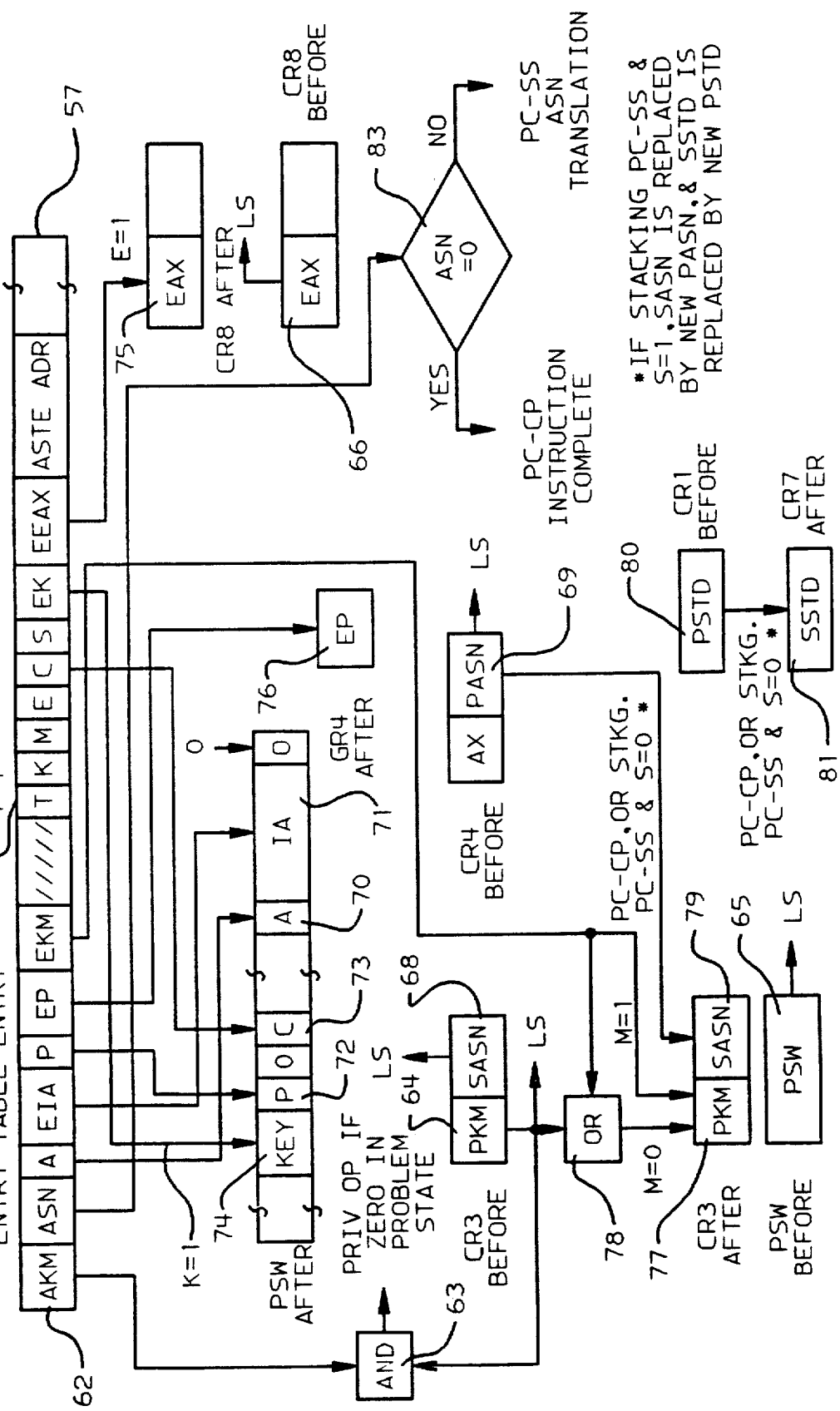
FIG. 16 is a diagrammatic illustration of the logic flow of a stacking operation of a stacking PROGRAM CALL instruction.

FIGS. 15, 16 and 17 present the logic flow of the steps necessary to execute a stacking PC operation. It will be noted that the logic flow of FIGS. 15, 16 and 17 can also be used to execute a DAS PROGRAM CALL instruction. The textual information in the figures describe how various values may be mathematically manipulated to form addresses. Referring back to FIG. 3, if bit 15 of control register 0 (CR0.15) is equal to zero, ETE is 16 bytes and only a DAS PROGRAM CALL operation can be performed. If CR0.15 is one, ETE is 32 bytes, and ETE bit 128 controls whether a DAS PC or a stacking PC is performed.

FIG. 15 is a logic flow diagram of the PC number translation operation of a program call. If CR0.15=1, the ASTE pointed at by the PASTEO entry in control register 5 (see FIG. 3) is fetched. This primary-ASTE includes an LTD at bits 96-127 (see FIG. 12). If the PROGRAM CALL is a DAS PROGRAM CALL (CR0.15=0) the LTD is located in control register 5 as in a normal DAS operation. The PROGRAM CALL instruction 50 includes an LX 51 and an EX 52, similar to that discussed in connection with the DAS facility. The LX 51 is joined with the linkage-table origin (LTO) 53 by an adder operation 53 to give the real address of a linkage table entry 55. The entry-table origin (ETO) of the linkage table entry 55 is joined with the EX52 by an adder operation 56 to give the real address of an entry-table entry (ETE) 57 in the entry table.

FIG. 16 is a logic flow of the steps which are executed in addition to the those shown in FIG. 15 for performing a stacking PROGRAM CALL to current primary (PC-cp) and a stacking PROGRAM CALL with space switching (PC-ss). As previously discussed, if the T bit 60 of the ETE 57 is equal to 1, a stacking operation is to be conducted. First, the value of the AKM 62 is ANDed at 63 with the PKM in control register 3 as it existed before the execution of the PROGRAM CALL instruction in the problem state, as shown at 64. If the result of the ANDing operation at 63 gives all zeroes, the PROGRAM CALL instruction is not authorized to enter at this point, and the PROGRAM CALL operation is terminated. If any one of the bits match in the ANDing operation of 63, the program is authorized to make the PROGRAM CALL at this entry, and the operation continues. If the PROGRAM CALL is authorized, the PSW at 65, the EAX at 66, the PKM 64, the SASN 68, and the PASN 69 as they all existed before the PROGRAM CALL are placed on the linkage stack. Also placed on the linkage stack, but not shown, are the contents of the general registers, the contents of the access registers, and the PC number (see FIG. 10). The addressing mode bit A and the entry instruction address are placed in the PSW at 70 and 71. The P-bit and C-bit of the ETE 57 are placed in the PSW at 72 and 73. If the K-bit is equal to 1, the entry key of the ETE 57 is placed in the key of the PSW at 74. If the E-bit is equal to 1, the entry EAX is placed in control register 8 at 75. The entry parameter (EP) is placed in general register 4 at 76. If the M bit of the ETE 57 is equal to 1, the entry key mask (EKM) replaces the PKM at 77 in the control register 3. If, however, the M bit is equal to 0, the EKM is ORed into the PKM of control register 3 by the ORing operation 78. If a PC-cp operation is being executed or a stacking PC-ss is being conducted and the S-bit is equal to 0, the PASN at 69 replaces the SASN at 79 in control register 3, and the PSTD at 80 in control register 1 replaces the SSTD 81 in control register 7. If a stacking PC-ss is being conducted and the S bit is equal to 1, the SASN in control register 3 is replaced by the new PASN and the SSTD in control register 7 is replaced by the new PSTD. After these operations, the ASN of ETE 56 is tested at 83. If the ASN is equal to 0, a PC-cp operation is being conducted and is complete. If, however, the ASN is not equal to 0, a PC-ss operation is being conducted and the ASTE is obtained for the destination space.

The PROGRAM CALL may change the PSW key 74 with the EK (K bit=1) to give access to fetch protected code of the next instruction.

By changing the EAX in control register 8 (see 75), each program executed to perform the work of the dispatchable unit can be differently authorized to use the ALEs in the DUAL and the PSAL. The EAX 75 in control register 8 can be set equal to the EEAX by a stacking PROGRAM CALL (E bit=1). The original EAX will then be restored from the linkage stack by a PROGRAM RETURN. Thus, each program can be executed with an EAX that is specified in the ETE that is used to call the program. Alternately, the EAX can remain unchanged during a calling linkage (E bit=0), allowing the called program to have the same authority as its caller.

By setting the PKM 77 in control register 3 equal to the EKM by a PROGRAM CALL (M bit=1), the called program has a PKM that is independent of the PKM of the calling program. This allows the called program to have less authority, in terms of the PSW key values it can set, than the calling program. Alternately, the new PKM 77 may be set equal to the OR of the old PKM 64 and the EKM (M bit=0), if desired (see 78).

Setting the new SASN and new SSTD equal to the new PASN and new PSTD, respectively (S=1), prevents the called program from automatically having access, through the use of ALET 00000001 hex, to the caller's primary address space (access capability still may be obtainable by means of either an ALE or the DAS SET SECONDARY ASN instruction). This is another way in which the authority of the called program can be less than that of the caller. Alternately, the new SASN at 79 and the new SSTD at 81 may be set equal to the old PASN at 69 and the old PSTD at 80, respectively (S bit=0).

FIG. 17 is a logic flow of the steps of an ASN translation. As in the DAS facility, each address space containing programs is assigned an ASN, whose value is stored at 90 in the corresponding ETE 57. Also as in DAS, the ASN at 90 consists of two numbers, an AFX 91 and an ASX 92. Control register 14 includes an ASN-first-table origin (AFTO) 93 which, when joined with the AFX at 91 by an adder operation at 94 gives the real address of an AFTE 95 in the ASN first table. The AFTE 95 includes an ASN-second-table origin (ASTO) 96 which, when joined with the ASX 92 by the adder operation at 97, forms the real address of the ASTE 98 in the ASN second table 30, also discussed in connection with FIG. 2. Since the ASTE address 100 is located in the ETE 57 when CR0.15 is one, it may be used in place of the ASN translation described. Control bit T, 101, located at bit 12 of control register 14 is an ASN translation bit. If bit 12 of control register 14 is zero, neither the ASTE address 100 nor the ASN 90 can be used. If bit 12 is one, either can be used. The AX 102 of ASTE 98 and the ASN 90 of ETE 57 are placed in control register 4 at respectively, for PC-ss operations. The STD 105 of the ASTE 98 is placed in control register 1 at 106. If CR0.15=1, the ASTE address is placed in control register 5 at 107 as the PASTEO. If CR0.15=0, the LTD at 108 of ASTE 98 is placed in control register 5 at 107. It can thus be seen that the ASN translation of FIG. 17 provides for either DAS or MAS operations.

The PC-ss operation discussed in connection with FIGS. 15, 16 and 17 may be used to transfer control to a new address space for instruction fetching operations, thereby establishing the new address space as the primary address space. Typically, when the PC number, the entry-table entry and the linkage-table entry are established by a service provider, an AKM is specified for setting the authority of programs calling that PC number. If a calling program has the authority to enter the program defined by the entry-table entry, as determined by the ANDing operation 63 of FIG. 16, the PC operation may change the EAX stored in control register 8.

For example, the PC operation may also be used to call a system service to add a new ALE to one of the access lists 24 or 25, as discussed in connection with the access list entry of FIG. 6. The service program can establish a new access list entry and provide a new ALET for use in access register mode operations by the calling user. When an access list entry is formed, the EAX from the callers control register 8 is placed in the ALE as the ALEAX. Once the ALE is created, the service program returns the ALET for that ALE to the user program. The ALET may then be stored, or passed to other address spaces, in any convenient manner for use in fetching or storing operands. The described authorization procedures prevent an unauthorized program from using an ALET.

Some access list entries may be designated by their owners at the time of creation either as private entries to provide address space access only by the owner or an authorized user, or as public entries open to all users. In the case of public entries (P-bit, bit 7 is zero), the ALE is open and free to be used by any program. If the P-bit (bit 7) of the ALE is set to one, the ALE is to be used only by authorized programs. The control program provides facilities for adding entries to the AT of the associated address space if more than one EAX is to be allowed to use the ALE.

FIG. 18 is a diagrammatic illustration of the access-register translation with program authorization checks. When an ALET is used in an access register operation to fetch or store an operand, bits 0–6 of the ALET are examined at 115 to insure that the ALET is valid. If the P-bit 116 in the ALET is 0, the access list is a DUAL, and if the P-bit 116 is 1, the access list is a PSAL. If the access list is a DUAL, the effective ALD is fetched from the DUCT whose address is stored in control register 2. If the access list is a PSAL, the effective ALD is fetched from the primary ASTE (PASTE) whose address is stored in control register 5. The effective ALD includes an access list origin and an access list length (ALL). At 117, the ALEN is compared to the ALL to determine that the ALEN is not outside the bounds of the access list. If the ALEN passes this validity check, the effective access-list origin is joined with the ALEN by an adder operation at 119 to find the address of the ALE 120 in the access list 121. The invalid bit, bit 0 of the ALE 120, is checked at 121 to see if it is 0, thereby determining if the ALE 120 is valid. If the ALE 120 is valid, the ALESN 122 of the ALET is compared to the ALESN 123 of the ALE 120 at 124. If the ALESN 122 is equal to the ALESN 123, the ALET is still authorized to designate the ALE 120, and the ASTE address 125 is used to fetch the ASTE 126. The validity of the ASTE 126 is confirmed by checking the invalid bit 127 at 128. If the ASTE 126 is valid, the ASTESN 130 is compared with the ASTESN 131 at 132 to insure that the ALE 120 is still authorized to designate the ASTE 126. These checks complete the validity portion of the ART.

The authority of the calling program to access the address space is now checked. The first check is made at 135 to determine if the P bit 136 is 0. If the P bit of 136 is 0, all programs are authorized to access the address space associated with the ALE, and no further checks are made. If the P bit 136 is 1, the ALEAX 137 is compared to the EAX 138 in control register 8 by the comparator 139. If the comparison at 139 is equal, then the program is specifically authorized to access the address space, and no further checks are made. If the comparison at 139 is not equal, then an ASN extended authorization check is made at 140. The ASN extended authorization check 140 is made by comparing the EAX in control register 8 with the authority table length (ATL) 141 to make sure that the EAX does not designate an entry outside of the bounds of the authority table. The EAX located in control register 8 is used as an index into the authority table whose origin is ATO 142. If the S bit in the authority table is set equal to 1 for that EAX, then the program is authorized to have access into the address space. If the program is authorized to have access to the address space, as described, the STD 144 is provided for the DAT operation at 145.

The private bit and the ALEAX field in the access list entry provide high performance authorization mechanisms to grant or prohibit a program's access to an address space represented by the ALE. The private bit can be 0, thus allowing all programs which execute with the access list to access the address space represented by the ALE. The ALE private bit can be 1 and the user's EAX in control register 8 can be equal to the ALEAX field. This allows programs with a particular EAX to access the address space represented by the ALE. Finally, the ALE private bit can be one and the user's control register 8 EAX can select an entry in the target space's authority table which has the S-bit equal to one. This allows multiple programs running with different EAXs to access the address space represented by the ALE.

FIG. 19A and 19B, when taken together, form a flow chart of the access register translation steps and exceptions. When the ART logic is invoked, a check is made at 150 to determine if access register 0 has been designated. If access register 0 has been designated, a check is made at 151 to determine if the ART was invoked by a TEST ACCESS operation (to be described). If access register 0 was not designated, or if this is a TEST ACCESS operation, the ALET in the access register is designated for use at 152. If access register 0 is designated and this is not a TEST ACCESS operation, a 00000000 hex is assigned to the ALET at 153. A check is made at 154 to determine if the ALET is equal to 00000000 hex. If yes, the STD for the primary address space is obtained from control register 1 at 155. At 156, a check is made to determine if the ALET has a value of 00000001 hex. If yes, the STD for the secondary address space is obtained from control register 7 at 157. A check is made at 158 to determine if bits 0-6 of the ALET are equal to 0. If bits 0-6 are not equal to 0, the assigned value of the ALET is not valid and an ALET specification exception is raised at 159 and the operation is suppressed.

A check is made at 160 to determine if the ALET bit 7 is 1. If it is, the PASTEO entry in control register 5 is decoded at 161 and the effective ALD is fetched for the PSAL. If the ALET bit 7 is equal to 0, the DUCTO entry in control register 2 is decoded at 162, and the effective ALD is fetched for the DUAL. If the fetching address is not valid at 163, an addressing exception is raised at 164, and the operation is suppressed. If the address is valid at 163, a check is made at 165 to determine if the ALEN of the ALET is outside the range of the effective ALL (bits 25-31 of the effective ALD). If it is, an ALEN translation exception is raised at 166, and operation is nullified. If the answer at 165 is no, the ALE is located at 167 and a check is made to see if the ALE address is valid. If the ALE address is not valid, an addressing exception is raised at 168 and the operation is suppressed. If the address is valid at 167, the valid bit in the ALE is checked at 169 to see if the ALE is valid. If the ALE is not valid, an ALEN translation exception is recognized at 170, and the operations is nullified. If the ALE is valid at 169, the ALESN of the ALET is compared to the ALESN of the ALE at 171. If the comparison at 171 is not equal, an ALE sequence exception is recognized at 172, and the operation is nullified. If there is an equal compare at 171, the ASTE is located at 173 using the ASTE address in the ALE. A check is made to determine if the ASTE address is valid. If the address is not valid, an addressing exception is raised at 174 and the operation is suppressed. If the ASTE address is valid at 173, the validity bit of the ASTE is checked at 175 to determine if the ASTE is valid. If the ASTE is not valid, an ASTE validity exception is raised at 176, and the operation is nullified. At 177, the ASTESN of the ALE is compared with the ASTESN of the ASTE. If there is not an equal comparison at 177, an ASTE sequence exception is raised at 178, and the operation is nullified.

The previous blocks 163-178 thus determine if the entries obtained are valid. At 179, the private bit of the ALE, bit 7, is checked to see if it is equal to 0. Also at 179, the ALEAX entry in the ALE is compared to the EAX in control register 8. If either of the checks are equal, the STD for the operand is obtained from the ASTE of the address space, as shown at 180. When the private bit is 0, the program is authorized, and the authorization step of the access register translation is completed. When the private bit is 1 but the ALEAX is equal to the EAX, the program is also authorized, and the authorization step of the access register translation is completed.

If the program is not yet authorized at 179, then at 181, the validity of the ASTE is checked by determining if the ASTE bits 30, 31, and 60-63 are 0. If not, an ASN translation specification exception is raised at 182 and the operation is suppressed. At 183, the value of the EAX bits 0-11 in control register 8 is compared against the length of the authority table to make sure that the EAX does not designate an entry outside of the bounds of the authority table. If the comparison at 183 is yes, an extended authorization exception is raised at 184 and the operation is suppressed. If the EAX designates an entry within the bounds of the authority table, the associated EAX entry is located in the authority table at 185. If the address of the authority table entry is not valid, an addressing exception is raised at 186 and the operation is suppressed. An extended authorization check is made at 187 by determining if the secondary authorization bit (S-bit) of the authority table entry located at 185 is equal to 1. If the check at 187 is yes, the program is one of those authorized by the authority table associated with the address space, and the STD for the address space is obtained from the ASTE at 188. If the comparison at 187 is no, the program is not authorized and an extended authority exception is recognized at 189, and the operation is nullified.

The MAS facility includes a TEST ACCESS REGISTER (TAR) instruction for performing the mentioned test access operation. TEST ACCESS has the following format:

TAR A1, R2

The ALET specified as being in the access register of the first operand A1 is checked for ALET translation exceptions using the EAX in the general register specified by the second operand R2. As shown in FIGS. 19A and 19B, the TEST ACCESS REGISTER instruction, as determined in 151 of FIG. 19A, causes an ART operation to be performed. The TAR instruction returns the following results of the test in the PSW condition code (CC) see FIG. 4.

0=ALET specified is 0 and is valid for access.
1=ALET specified is not 0 or 1, is in the DUAL addressed by control register 2, and is valid for access with the specified EAX.
2=ALET specified is not 0 or 1, is in the PSAL addressed by control means of register 5, and is valid for access with the specified EAX.

3 = ALET specified either is 1 or is invalid for access with the specified EAX.

The ability to test an ALET for authorization exceptions using an input EAX allows the program to determine if the ALET references the caller's PASN (ALET=0), or if the ALET references the DUAL, or if the ALET references the caller's PSAL. This allows the program to be independent of the internal format of the ALET.

When the TAR instruction is used and ART is performed, an ALB entry is created. Thus, when the ALET in the AR is actually used, the ALB contains the entry, provided no exception occurred during ART.

FIG. 20 shows an example use of the TAR instruction. A dispatchable unit task control block TCB1, while executing at 200, has an EAX of 5. This EAX allows the program to use specific entries on its dispatchable unit access list for TCB1. At 201, the first program makes a PC call to a second program which resides in address space ASN2, and the first program passes an ALET which the second program in ASN2 must use. At 202, the program in ASN2 is executed with an EAX=8, which is different from its caller's EAX. If at 202, the program used the ALET provided by the calling program, there could be a system integrity problem. The calling program may not have had the EAX authority to reference the ALET, but the ASN2 program does. The ASN2 program must perform a validity check to determine if the caller had the authority to use the ALET that is passed. At 203, the program in ASN2 makes the validity check using the TAR instruction with the input ALET and the EAX=5 of the caller. The caller's EAX is obtained from the linkage stack entry made on the program call to ASN2. If the TAR instruction gives a condition code which states that the caller was authorized to use the ALET, then the ASN2 program will continue to perform its function. If the caller was not authorized, then the ASN2 program will either ABEND the caller, or return to the caller with a return code which indicates that the call was not successful. When control returns at 204 by means of a RETURN instruction, the callers EAX (EAX=5) is restored from the stack, and the ASN1 program continues to execute with that EAX.

The ALET validity check function is needed quite frequently. In the example of FIG. 20, it is needed on every call to the program in ASN2. This function could be provided by an operating system service routine, however, the performance overhead would be excessive. If the TAR function is not provided, programs which must reference a caller's ALET and change the EAX, may need to use two PC instructions. The first PC would not change the EAX and the caller's parameters would be referenced with the callers EAX. Later, a second PC would be executed to provide the new EAX for the called program to use. The called service may require a different EAX to do its function and this mechanism allows use of the correct EAX. The TAR function thus provides a more efficient performance. It will be understood that, although the example of FIG. 20 shows the TAR instruction used with an ALET on the DUAL, the TAR instruction can be used with ALETs on both the DUAL and PSAL.

Referring to FIGS. 21-25, the access register translation (ART) mechanism normally is implemented such that access list designations and information specified in access lists, ASN second tables, and authority tables are maintained in a special buffer, referred to as the ART lookaside buffer (ALB) previously shown at 199 in FIG. 2. Access list designations, access list entries, ASN second table entries, and authority table entries are collectively referred to as ART table entries. The CPU necessarily refers to an ART table entry in real storage only for the initial access to that entry. The information in the entry may be placed in the ALB, and subsequent ART operations may be performed using the information in the ALB. The presence of the ALB affects the ART process to the extent that a modification of an ALD, ALE, ASTE, or ATE entry in real storage does not necessarily have an immediate, if any, effect on the translation.

The size and the structure of the ALB depend on various possible embodiments. For instance, the ALB may be implemented such as to contain at most 15 entries corresponding one to one with access registers 1-15, with each entry consisting of only a segment table designation (see FIG. 24); or it may contain arrays of values which are selected on the basis of an ALET, the current dispatchable unit control table origin or primary ASTE origin, and the current extended authorization index. In the first case, an ALB entry is cleared when the corresponding access register is reloaded, and the entire ALB is cleared upon a change to the contents of control register 2, 5 or 8. In the second case, information in the ALB persists despite changes of access register contents or control register contents.

Entries within the ALB are not explicitly addressable by the program.

Information is not necessarily retained in the ALB under all conditions for which such retention is possible. Furthermore, information in the ALB may be cleared under conditions additional to those for which clearing is mandatory. All information in the ALB is necessarily cleared only by execution of PURGE ALB or SET PREFIX or by a CPU reset.

An ALB entry contains information fetched from an ART table entry in real storage and also the information used to select the ART table entry in real storage. An access list designation source origin (ALDSO) is used to select an ALD in real storage. The ALDSO is the dispatchable unit control table origin in control register 2 if the primary list bit in the ALET being translated is zero, or it is the primary ASN second table entry origin in control register 5 if the primary list bit in the ALET is one.

The access list origin part of an ALD, along with an ALET, is used to select an ALE in real storage.

The ASTE address in an ALE is used to select an ASTE in real storage.

The authority table origin in an ASTE, along with the EAX in control register 8, is used to select an ATE in real storage.

Referring to FIG. 21, in a first embodiment of an ALB, the ALB-ALD and the ALB-ALE are combined into an ALB-ALD/ALE so that the access list origin need not be in the ALB entry. If the ALDSO and ALET for the ART request match the content of the ALB entry, then the ALB provides the following information: P bit, the ALEAX, the ASTE address and the ASTESN, all from the ALE. Thus, this entry type allows the verification of authority to be relooked at and access to ASTE for the STD, with verification of the ASTESN entry, to be made at time of use. This provides efficient use of the ALB because different ALETS may point to the same ASTE and STD. Thus, this design of the ALB substitutes for use of the proper access list and determination of the ALE. However, the ASTE and authority mechanisms are used as before.

Referring now to FIG. 22, the function of the ASTE may also be combined into a different embodiment of the ALB so that the STD is directly obtained from the ALB. Thus, the ALDSO and ALET, if a match exists in the ALB, provide the following information: P-bit, ALEAX, authority table origin (ATO), authority table length (ATL) and STD. Thus, the ASTE is not accessed for the STD, ATO and ATL because it has been retained in the ALB. However, if an ASTESN is changed in the ASTE, the ALB must be purged because the ALB contains the STD without reverification of the capability through the ASTESN.

Referring to FIG. 23 a third embodiment of an ALB combines into a single ALB entry the information and the attributes from the ALD, ALE, ASTE and ATE so that the ALB entry shown in the figure is all that is necessary.

To further simplify, if the embodiment of FIG. 23 automatically clears the ALB of all entries whenever an ALD source origin is changed in control register 2 or 5, then the ALDSO field is not required in any ALB entry. As an additional simplification, the P, ALEAX, EAX and S fields need not be implemented if the machine clears the ALB of entries whenever the EAX field is changed in control register 8. Such a simplified embodiment is shown in FIG. 24 where each ALET simply fetches an STD, dependent on the necessary ALB purge operations to protect the STD's from improper use. Finally, if each entry corresponds one to one with one of access registers 1-15 and is cleared when the access register is reloaded, the ALET field is not required.

Translations of ALET values of zero and one are not permitted to use the ALB. If the actual implementation has additional copies of the contents of control registers 1 and 7, the machine may have to perform some type of special action in order to track changes to these control registers.

The formation of ALB entries and the effect of any manipulation of an ART table entry in real storage by the program depend on whether the ART table entry is attached to a particular CPU and on whether the entry is valid.

The attached state of an ART table entry denotes that the CPU to which the entry is attached can attempt to use the entry for access register translation. The ART table entry may be attached to more than one CPU at a time.

An access list entry or ASN second table entry is valid when the invalid bit associated with the entry is zero. Access list designations and authority table entries have no invalid bit and are always valid. The primary space access list designation is valid regardless of the value of the invalid bit in the primary ASTE.

An ART table entry may be placed in the ALB whenever the entry is attached and valid. An access list designation is attached to a CPU when the designation is within the dispatchable unit control table specified by the dispatchable unit control table origin in control register 2 or is within the primary ASTE specified by the primary ASTE origin (PASTEO) in control register 5. Control register 5 is considered to contain the primary ASTE origin regardless of the value of the multiple address space control, bit 15 of control register 0.

Referring now to FIG. 25, the preferred embodiment of an ALB is shown in which the ALB consists of several different tables which are accessed separately and sequentially during ALB usage and can thus provide more than one path to an STD. In the first step, a table or array referred to as an ALB-ALD/ALE table is accessed by an entry consisting of an ALDSO and an ALET which is compared (in the blocks labeled C) with all table entries and if a match is found the correct result is gated at blocks G to the next step. The ALB-ALD/ALE table entries provide as resultant information the P-bit (private bit), the ALEAX, the ASTE address and the ASTESN. In the second step, the ASTE address is used as the search term in an ALB-ASTE table or array, again shown by the C compare blocks. If a match is found, an ALB-ASTE entry is gated, as shown by G, consisting of an ASTESN, an ATO, and ATL and an STD. The ASTESN is in turn compared with the ASTESN provided from the ALB-ALD/ALE entry and there must be a match or the ALB process will not continue. If the P bit from the ALB-ALD/ALE entry is one and the EAX in CR8 does not equal the ALEAX in the ALB-ALD/ALE entry, then, as a last step, authority is checked using an ALB-ATE table or array. The ATO and EAX are together used as a search key. The EAX is determined from control register 8 and the ATO is used from the result found in the second step. Again if a match is found, an entry consisting of a secondary bit, S bit, from the ATE is gated as the result for testing authority.

An ASN second table entry is attached to a CPU when it is designated by the ASTE address in either an ALB-ALD/ALE array entry or an attached and valid ALE.

An authority table entry is attached to a CPU when it is within the authority table designated by either an ALB-ASTE array entry or an attached and valid ASTE.

An ALB-ALD/ALE entry may be used for ART only when all of the following conditions are met:
1. The ALET to be translated has a value larger than 1. (If the ALET is 0 or 1, the contents of CR1 or CR7 are used.)
2. The ALDSO field in the ALB-ALD/ALE matches the ALDSO field in the ALD being used.
3. The ALET field in the ALB-ALD/ALE matches the ALET to be translated.
4. The ALB-ALD/ALE entry passes the ALE authorization test; that is, one of the following conditions is true:
   a. The private bit in the ALB-ALD/ALE entry is zero.
   b. The ALEAX in the ALB-ALD/ALE entry equals the current EAX.
   c. The current EAX selects a secondary bit(s) that is one for the authority table designated by the ASTE that is addressed by the ALB-ALD/ALE.

An ALB-ASTE entry may be used for ART whenever the ASTE address and ASTESN in the ALB-ASTE entry match the ASTE address and ASTESN in the ALE or ALB-ALD/ALE being used.

In addition, two or more ALB-ALD/ALE entries may designate the same ALB-ASTE entry, thus providing more paths to the ALB-ASTE array and justifying the use of separate array types in the ALB.

An ALB-ATE entry may be used for ART when both of the following conditions are met:

1. The ATO in the ALB-ATE entry matches the ATO in the ASTE or ALB-ASTE entry being used.
2. The EAX in the ALB-ATE entry matches the current EAX.

When an attached but invalid ART table entry is made valid, or when an unattached but valid ART table entry is made attached, and no usable entry formed from the ART table entry is already in the ALB, the change takes effect no later than the end of the current instruction.

The contents of the ALB need not be affected by a change of AR contents. The ALB can contain information pertaining to different AR contents or different EAX domains having different dispatchable units all at the same time. If a task is redispatched after being undispatched the ALB may still contain usable entries for ART.

When an attached and valid ART table entry is changed, and when, before the ALB is cleared of copies of that entry, an attempt is made to perform ART requiring that entry, unpredictable results may occur, to the following extent. The use of the new value may begin between instructions or during the execution of an instruction, including the instruction that caused the change. Moreover, until the ALB is cleared of copies of the entry, the ALB may contain both the old and the new values, and it is unpredictable whether the old or new value is selected for a particular ART operation.

When LOAD ACCESS MULTIPLE or LOAD CONTROL changes the parameters associated with ART, the values of these parameters at the start of the operation are in effect for the duration of the operation.

All entries are cleared from the ALB by the execution of PURGE ALB and SET PREFIX instructions and by a CPU reset. These instructions will have to be used to prevent undesired conditions in the ALB.

The multiple address space (MAS) facility offers improvements in two major areas:

1. Data Accessing: Data in up to 16 different address spaces, including the instruction space, can be accessed concurrently by the program without changing any control parameters. This facility is provided by means of 16 new registers named access registers. Still more address spaces can be accessed by changing the contents of the access registers.

2. Program Linkage: The contents of an entry table entry are extended to allow increased status changing during a program call operation. A linkage stack is provided for saving status during program call and for restoring it by means of a new instruction named program return. There is also a new branch type linkage that uses the linkage stack.

MAS provides sixteen 32-bit access registers numbered 0–15. Access registers are used to address storage operands in a new addressing mode called the access register mode. The access register mode results from new bit settings in the PSW.

In the access register mode, an instruction B or R field that designates a general register containing a storage operand address also designates the same numbered access register. The contents of the access register are used in a process called access register translation (ART) to obtain the segment table designation that will be used to translate, by means of DAT, the storage operand address.

An address space specified by means of an access register is called an AR specified address space.

Access registers apply only to data addresses, not instruction addresses. In the access register mode, instructions are always fetched from the primary address space. (It is not possible to branch from one address space to another.)

The contents of the access register designated by the X field of a format RX instruction are ignored; only the access register designated by the B or R field is used in ART.

Through the use of access registers, data can be moved between any two address spaces and the complete instruction set can be used to operate on data in multiple different spaces all at the same time.

The DAS instructions Move to Primary and Move to Secondary are not allowed to be executed in the access register mode. However, the DAS instruction Move with Key can be executed, so that the ability to have different access keys for the source and target data areas still is available.

The contents of an access register are called an access-list-entry token (ALET) because, in the general case, they designate an entry in a data area called an access list. ART uses the contents of the designated access list entry to obtain the segment table designation that will be used by DAT.

The term "token" is used because an ALET does not directly convey any capability to access an address space; it only designates an access list entry, which represents the actual capability.

ALETs are manipulable as ordinary data. MAS includes instructions for transferring ALETs between access registers, general registers, and storage. Specifically, a called program can save the contents of the access registers in storage, load the access registers for its own purposes, and then restore the original contents so that the calling program will find them unchanged.

An ALET can be transferred to and from access register 0 even though access register 0 does not participate in the addressing of a storage operand.

There are two special values of the ALET, 0 and 1, that specify the primary space and secondary space, respectively, without the use of an access list entry. Thus, a program can have access to its own instruction address space without the need to form an access list entry that designates the space, and, after a space switching program call, the called program can similarly have access to the caller's space. A called program can be denied access to its callers space.

Entries in the access list are the addressing capabilities that are usable by means of access registers. The access list is intended to be protected from the problem state program to ensure the integrity of the addressing capabilities.

The control program will provide a service that allocates an access list entry and returns an ALET designating the entry. The ALET can then be used by the requesting program to access the address space designated by the entry. The control program will also provide a service for deallocating an access list entry so the entry can be reused.

An access list entry is marked invalid when it is not in the allocated state. An exception is recognized on an attempt to use an invalid access list entry.

There are actually two access lists available to a program at the same time. One is called the dispatchable unit access list and the other the primary space access list. The dispatchable unit access list is intended to be permanently associated with the dispatchable unit (the architectural term meaning "task" or "process") on behalf of which the program is being executed. The primary space access list is a property of the primary address space in which the program is being executed. A bit in the ALET specifies which one of the dispatchable unit and primary space access lists is designated by the ALET.

A bit in the access list entry specifies whether the entry is public or private. No authorization is required for the use of a public access list entry. The use of a private access list entry must be authorized by an extended authorization index (EAX). The extended authorization index may be a property of either the dispatchable unit or the program, as will be described. It is not a property of the primary space in which the program is executed.

Through the use of the extended authorization index, an entry in a dispatchable unit access list may be usable by some, but not all, of the programs that are executed to perform the work of the dispatchable unit. Similarly, an entry on a primary space access list may be usable by some, but not all, of the programs that are executed in the corresponding primary space.

The DAS authorization index has a bearing on the use of access registers since it authorizes the use of set secondary ASN in establishing a secondary space, and the secondary space can be accessed by means of an ALET of 1. As has been said, the authorization index is a property of the primary space.

With MAS, program call is changed to test a new bit, named the PC type bit, in the entry table entry. If this bit is zero, program call performs the DAS operation described in DAS program linkage which is now called the basic operation. If the bit is one, program call performs a new operation called the stacking operation. The stacking operation makes some state changes differently than the basic operation, and it saves the old state in an entry it forms in a linkage stack. The linkage stack state entry is logically deleted, and the old state is restored, by a new instruction named program return.

It is intended that there be a separate linkage stack for each dispatchable unit and that the linkage stack be protected from direct manipulation by the dispatchable unit. MAS includes instructions for extracting information from a state entry and for modifying one field in the entry.

MAS includes the branch and stack instruction, which may be used in place of branch and link. The only state information changed by branch and stack is the instruction address in the PSW. Branch and stack forms a state entry, called a branch state entry, that is the same as a program call state entry, except that it indicates that it was formed by branch and stack and contains the branch address instead of a PC number.

The addressing mode bit and instruction address that are part of the complete PSW saved in a branch state entry can be either the current values in the PSW or can be specified in a register as an operand of branch and stack. This register can be one that had link information placed in it by a branch and link, branch and save, branch and save and set mode, or branch and set mode instruction. Thus, branch and stack can be used either in a calling program or at (or near) the entry point of a called program, and in either case, a program return at the end of the called program will return correctly to the calling program. The ability to use branch and stack at an entry point allows the linkage stack to be used without changing old calling programs.

The MAS instruction program return (PR) is used to return from a program given control by means of either stacking program call or branch and stack. Program return logically deletes the last linkage stack state entry, which may be either a program call state entry or a branch state entry. If the last state entry is a program call state entry, program return restores all of the state information that was saved in the entry, except that it leaves the contents of general registers 15, 0 and 1 and access registers 15, 0 and 1 unchanged. If the last state entry is a branch state entry, program return restores only the complete PSW and the contents of general registers 2-14 and access registers 2-14. However, program return always leaves the PER mask in the PSW unchanged in order not to counteract a PER enablement or disablement that may have occurred while the called program was being executed.

A bit can be set to one in a linkage stack state entry to cause a program interruption if program return operates on the entry. The control program may set this bit to one to guard against an erroneous use of program return, for example, when the last linkage instruction executed was a supervisor call instruction in which case the exit service of the control program should be used before program return.

When a job step is started, which at least initially is a single dispatchable unit, it does so in an address space that is unique to the job step. This address space is called the home address space of the job step. The system places the principal control blocks that represent the job step (for example, where status is saved when the job step is undispatched) in the home address space of the job step. If the job step uses program call to give control to another space and then an I/O or external interruption occurs, the control register contents must, without MAS, be changed in order to gain access to the home address space so it can save the status of the step.

To improve the efficiency of accessing the home address space, MAS includes a home segment table designation and another address space mode, named the home space mode, which is conditioned by bit settings in the PSW. The new PSW that is loaded by the machine when an interruption occurs can specify the home space mode to provide immediate access to the home address space.

Access registers are 32-bit hardware registers available to the problem program. An access register (AR) may be used to associate an operand base register with an address space when storage is referenced. The basic function of ARs is to extend the 370-XA instruction set to operate on instructions and storage operands in multiple spaces.

There are sixteen ARs, each one being directly associated with a GPR; i.e., AR0 with GPR0, AR1 with GPR1, ..., AR15 with GPR15. ARs are only involved in the addressing mechanism when the CPU is running in access register mode as determined by program status word (PSW) bits 16 and 17.

The general attributes of ARs are as follows:
1. The contents of access registers may be freely manipulated by a program in problem or supervisor state, whether in access register mode or not.
2. Instructions in the architecture are provided to load and store AR contents from storage, transfer the contents from ARs to GPRs and vice versa, and to copy values from one access register to another.
3. The content of an access register is a token which can determine an address space via a hardware table lookup process: access register translation ART. This token is called an Access List Entry Token (ALET).

4. The hardware associates the ALET value, in an AR, with an address space when storage references are made in access register mode. The access register is implicitly determined in the hardware by the base register field of the instruction when used. The implicit designation of the AR allows the multiple address space access function to be extended to existing 370-XA instructions without modifying their machine code format.

5. The AR corresponding to the GPR specified in the index register field of an RX instruction does not participate in the selection of an address space.

6. All instructions and the target of an Execute instruction are always fetched from the primary address space when running in access register mode.

7. The same ALET value can be in more than one AR.

8. AR usage for addressing is done only in access register mode, when PSW bits 16 and 17 are 0 and 1 respectively.

The Access List (AL) is an addressing capability table that is used with access registers (ARs) and which is in the form of a dispatchable unit access list (DUAL) or a primary space access list (PSAL). The entries in the AL define the address spaces that can be addressed via ARs for a given DU. When a storage reference instruction is executed in access register mode, the base register field of each operand is associated with an entry in the AL determined by the Access List Entry Token (ALET) contained in the corresponding access register.

An access list represents a list of addressing capabilities. These capabilities define address spaces that can be accessed by the associated dispatchable unit. During addressing in access register mode, access list entries provide the means for the hardware to locate an alternate segment table origin to use for Dynamic Address Translation with respect to a storage operand of an instruction. An access list entry allows this by containing the real address of an Address Space Second Table Entry (ASTE) which in turn contains the addresses of the segment table and authority table associated with the address space.

| GLOSSARY | |
|---|---|
| AKM | Authorization Key Mask |
| AL | Access List - An addressing capability table. |
| AR | Access Register - each access register is associated with a GPR. |
| ART | Access Register Translation - A method of associating a STD - segment table designation with an access register. |
| AX | Authorization Index |
| ALB | ART Lookaside Buffer - ART occurs each time an AR is designated by a B field storage operand reference in a GPR, and the ALB reduces storage references during ART. |
| ALE | Access List Entry |
| ALEAX | Access List Entry Authorization Index |
| ALEN | Access List Entry Number - Bits 16–31 of the ALET are the access list entry number of the designated ALE. |
| ALL | Access List Length - Stored in a control register as a predetermined number and can at most permit 1024 access list entries. |
| ALET | Access List Entry Token - An ALET designates an entry in an access list. |
| ALESN | Access List Entry Sequence Number - Bits 8–15 of the ALET and of the ALE. |
| ASN | Address Space Number - Represents an address space. |
| ASTE | ASN Second Table Entry - This is an expression |

| -continued | |
|---|---|
| GLOSSARY | |
| | of the 370/XA ASTE shown in the prior art and includes an 1 bit and an STD. |
| ASTESN | ASTE Sequence Number - The ASTESN in the ALE is tested for equality with ASTESN in ASTE. |
| ATL | Authority Table Length. |
| DAS | Dual Address Space |
| DASD | Direct Access storage device. |
| DAT | Dynamic Address Translation - Uses an STD to convert virtual address to real storage addresses. |
| DUAL | Dispatchable Unit Access List |
| DUALD | DUAL designation consisting of the real origin and length of the DUAL |
| DUCT | Dispatchable Unit Control Table - contains DUALD and specified by CR2 |
| EAX | Extended Authorization Index |
| EKM | Entry Key Mask |
| ETE | Entry Table Entry |
| GPR | General Purpose Register for containing operands and addresses |
| LTD | Linkage Table Designation |
| MAS | Multiple Address Space |
| P Bit | Bit in ALET that selects between DUAL and PSAL |
| PRIVATE-Bit | Bit P in the ALE that designates whether all users may have access or an authority mechanism is invoked. |
| PASTE | Primary ASN second table entry - contains PSAL and LTD |
| PC-cp | Program Call to Current Primary |
| PC-ss | Program Call with Space Switching |
| PKM | PSW Key Mask |
| PSAL | Primary Space Access List |
| PSALD | PSAL Designation consisting of the real origin and length found in the primary ASTE |
| PSTD | Primary Segment Table Designation |
| PSW | Program Status Word |
| SSTD | Secondary Segment Table Designation |
| STD | Segment Table Designation |

While the invention has been described with reference to the preferred embodiments thereof, various modifications and changes may be made by those skilled in the art without departing from the true spirit and scope of the invention as defined by the claims hereof.

Having thus described our invention, what we claim as new and desire to secure by Letters Patent is:

1. A method of operating a central processor which can execute programs each having access to multiple address spaces, comprising the steps of:
    identifying a context switching instruction issued by a first program executing in a first address space as any of a program call instruction and a branch and link instruction, to a second program,
    when the context switching instruction is identified as the program call instruction, using the program call instruction to index into an entry table comprising information defining a second address space and identifying the second program designated to execute therein,
    selecting an address of a linkage stack entry in an area of memory protected from direct access by the first and second programs,
    storing, in the linkage stack entry, data indicative of the first address space, a location of the context switching instruction in the first address space, and information identifying the linkage stack entry as one of a branch state entry resulting from the branch and link instruction and a program call state entry resulting from the program call instruction, after said storing, when the context switching instruction has been identified as the program call instruction, causing the central processor to activate the second address space as that from which execution of instructions is to occur and commencing execution of the second program as within the addressability of the second address space, after said storing, when the context switching instruction has been identified as the branch and link instruction, commencing execution of the second program as within the addressability of the first address space, after said commencing execution of the second program, identifying a program return instruction issued by the second program, and in response to said identifying of the program return instruction, (a) accessing the linkage stack entry, (b) when the information (identifying the linkage stack entry) indicates that the linkage stack entry is a program call state entry, providing the central processor with the data indicative of the first address space, (c) providing the central processor with the location of the context switching instruction, (d) causing the central processor to activate the first address space as that from which execution of instructions is to occur, and (e) recommencing execution of the first program from a point after the context switching instruction.

2. The method of claim 1 wherein said step of selecting an address of a linkage stack entry comprises the steps of:

determining a home address space of the first program; and selecting the address of the linkage stack entry in the home address space.

3. A mechanism for enforced retraceable program linkage, comprising:

central processor means for executing programs, a main memory containing a first program executing in a first address space, the first program including a program call to a service provider comprising a second program designated to execute in a second address space, the program call including a program call number indicative of the second program, first linkage means, connected to receive the program call, the first linkage means including entry table means for identifying the second program and for causing the central processor to activate the second address space as that from which execution of instructions is to occur;

second linkage means, connected to receive the program call, the second linkage means including a linkage stack for storing the program call number and data indicative of the first address space;

protection means, coupled to said linkage means, for protecting the linkage stack means from direct access by the first and second program; and return means, coupled to the central processor means and connected to receive the data indicative of the first address space from the linkage stack, for causing the central processor means to activate the first address space as that from which execution of instructions is to occur, responsive to a return instruction issued by the second program, said linkage stack comprising a plurality of sections, each section of said linkage stack comprising:

header entry means for holding first information indicative of a trailer entry in a preceding linkage stack section;

state entry means for holding second information indicative of computer system states when the program call was issued, the second information comprising the program call number and the data indicative of said first address space, and for holding third information indicative of an amount of free space remaining in a section containing the state entry means;

trailer entry means for holding fourth information indicative of a header entry of a next succeeding linkage stack section; and wherein said mechanism further comprises stack formation means, connected to receive the third information from the state entry means, for: (a) determining when the amount of free space remaining in said section is sufficient to hold an additional state entry means, (b) forming the additional state entry means in the section, responsive to a subsequent program call when the amount of free space is sufficient to hold the additional state entry means and, (c) forming the additional state entry means in the next succeeding linkage stack section, responsive to the subsequent program call when the amount of free space is not sufficient to hold the additional state entry means.

4. In a computer system of a type wherein a first program designated to execute in a first address space can issue a program call to a second program designated to execute in a second address space, a linkage stack mechanism comprising:

a plurality of sections, each section including:

header entry means for holding first information indicative of a trailer entry in a preceding linkage stack section;

state entry means for holding second information indicative of computer system states when the program call was issued, the second information comprising a program call number indicative of the program call and data indicative of the first address space, and for holding third information indicative of an amount of free space remaining in a section containing the state entry means;

trailer entry means for holding fourth information indicative of a header entry of a next succeeding linkage stack section; and, stack formation means, connected to receive the third information from the state entry means, for: (a) determining when the amount of free space remaining in the section is sufficient to hold an additional state entry means, (b) forming the additional state entry means in the section, responsive to a subsequent program call when the amount of free space is sufficient to hold the additional state entry means and, (c) forming the additional state entry means in the next succeeding linkage stack section, responsive to the subsequent program call when the amount of free space is not sufficient to hold the additional state entry means.

* * * * *